(12) United States Patent
Nishimori et al.

(10) Patent No.: US 12,241,961 B2
(45) Date of Patent: Mar. 4, 2025

(54) DEVICE AND METHOD FOR DETECTING TARGET OBJECT

(71) Applicant: Furuno Electric Co., Ltd., Nishinomiya (JP)

(72) Inventors: Yasushi Nishimori, Sanda (JP); Yasunobu Asada, Auckland (NZ); Shinya Tanimura, Auckland (NZ)

(73) Assignee: FURUNO ELECTRIC CO., LTD., Nishinomiya (JP)

( * ) Notice: Subject to any disclaimer, the term of this patent is extended or adjusted under 35 U.S.C. 154(b) by 578 days.

(21) Appl. No.: 17/557,067

(22) Filed: Dec. 21, 2021

(65) Prior Publication Data

US 2022/0113393 A1 Apr. 14, 2022

Related U.S. Application Data

(63) Continuation-in-part of application No. PCT/JP2020/018145, filed on Apr. 28, 2020.

(30) Foreign Application Priority Data

Aug. 1, 2019 (JP) .................................. 2019-142342

(51) Int. Cl.
*G01S 13/04* (2006.01)
*G01S 15/04* (2006.01)

(52) U.S. Cl.
CPC .............. *G01S 13/04* (2013.01); *G01S 15/04* (2013.01)

(58) Field of Classification Search
CPC ...................................................... G01S 13/04

(Continued)

(56) References Cited

U.S. PATENT DOCUMENTS 3,916,407 A 10/1975 Bosc et al.
4,209,843 A * 6/1980 Hyatt ................... G05B 19/408
708/422

(Continued)

FOREIGN PATENT DOCUMENTS

EP 2 846 169 A1 3/2015
EP 4009069 A1 6/2022

(Continued)

OTHER PUBLICATIONS

Chilean Office Action issued May 30, 2023 in corresponding Chilean Patent Application No. 2021-002928 (machine-generated English translation only).

(Continued)

*Primary Examiner* — Vladimir Magloire
*Assistant Examiner* — Eric K Hodac
(74) *Attorney, Agent, or Firm* — XSENSUS LLP

(57) ABSTRACT

The present disclosure provides a target object detection device. The target object detection device includes a first transmission signal generator, a first transmission array, a first switch, and a controller. The first transmission signal generator is configured to generate a first transmission signal. The first transmission array includes a plurality of first transmission elements configured to convert the first transmission signal into a transmission wave. The first switch is configured to supply the first transmission signal to one of the first transmission elements in the first transmission array. The controller is configured to control the first switch to switch the first transmission element to which the first transmission signal is supplied from a first element to a second element at a first timing.

20 Claims, 25 Drawing Sheets

(58) Field of Classification Search
USPC .................................................... 342/147
See application file for complete search history.

(56) References Cited

U.S. PATENT DOCUMENTS

| | | | |
|---|---|---|---|
| 5,327,396 | A | 7/1994 | Yasushi |
| 6,778,468 | B1 | 8/2004 | Nishimori et al. |
| 7,355,924 | B2 | 4/2008 | Zimmerman et al. |
| 2011/0140952 | A1* | 6/2011 | Kemkemian ......... G01S 13/426 |
| | | | 342/146 |
| 2015/0099977 | A1 | 4/2015 | Kim et al. |
| 2017/0139044 | A1 | 5/2017 | Laster |
| 2017/0315220 | A1 | 11/2017 | Kozuki |
| 2017/0315229 | A1 | 11/2017 | Pavek et al. |
| 2019/0195984 | A1 | 6/2019 | Goda |
| 2020/0166623 | A1* | 5/2020 | Sahin ..................... G01S 7/006 |
| 2022/0113393 | A1 | 4/2022 | Nishimori et al. |
| 2022/0387851 | A1* | 12/2022 | Tuxen .................... G01S 13/58 |

FOREIGN PATENT DOCUMENTS

| | | | |
|---|---|---|---|
| JP | S56-151370 A | | 11/1981 |
| JP | 7-218619 A | | 8/1995 |
| JP | 2003004901 A | * | 1/2003 ............ G01S 15/96 |
| JP | 2003-315447 A | | 11/2003 |
| JP | 2003-337171 A | | 11/2003 |
| JP | 2019-113379 A | | 7/2019 |
| WO | 92/02830 A1 | | 2/1992 |
| WO | 99/34234 A | | 7/1999 |
| WO | 2016/120745 A1 | | 8/2016 |
| WO | 2021/019858 A1 | | 2/2021 |

OTHER PUBLICATIONS

International Search Report and Written Opinion mailed on Feb. 1, 2022, received for PCT Application No. PCT/JP2021/042613, filed on Nov. 19, 2021, 9 pages including English Translation.
Extended European search report issued on Jul. 6, 2023, in corresponding European patent Application No. 20845907.3, 18 pages.
International Search Report and Written Opinion mailed on Jul. 21, 2020, received for PCT Application PCT/JP2020/018145, Filed on Apr. 28, 2020, 9 pages including English Translation.
Supplementary European search report issued on Nov. 5, 2024, in corresponding European patent Application No. 21910085.6, 11 pages.

* cited by examiner (a)

(b)

(a)

(b)

(a)

(b)

(a)

(b)

(c)

(d)

DEVICE AND METHOD FOR DETECTING TARGET OBJECT

CROSS-REFERENCE TO RELATED APPLICATION(S)

This application is a continuation-in-part of PCT International Application No. PCT/JP2020/018145, which was filed on Apr. 28, 2020, and which claims priority to Japanese Patent Application No. JP2019-142342 filed on Aug. 1, 2019, the entire disclosures of each of which are herein incorporated by reference for all purposes.

TECHNICAL FIELD

The present disclosure relates to a target object detection device and a target object detection method which transmit a transmission wave and detect a target object based on a reflection wave of the transmission wave.

BACKGROUND

Conventionally, target object detection devices which transmit transmission waves and detect a target object based on reflection waves of the transmission waves are known. This type of target object detection device detects the target object, for example, by using a transmission-and-reception array in which elements for wave transmission and reception are arrayed two-dimensionally. For example, the transmission waves are transmitted using an element at the center of the transmission-and-reception array, and the reflection waves are received using all the elements of the transmission-and-reception array. When receiving the waves, reception beams are formed in various directions by a phase control to all the elements, and thus, reception signals corresponding to the directions are generated. By processing the reception signals in the respective directions, a target object is detected in each direction.

The target object detection device with the configuration described above includes a large number of elements in the transmission-and-reception array, and also includes a large number of transmission channels and reception channels. Therefore, the configuration of the target object detection device is complicated, and a cost reduction is difficult.

In view of the above problems, one purpose of the present disclosure is to provide a target object detection device and a target object detection method, capable of promptly detecting a target object with a simple configuration.

SUMMARY

The first aspect of the present disclosure relates to a target object detection device. The target object detection device according to this aspect includes a first transmission signal generator, a first transmission array, a first switch, and a controller. The first transmission signal generator generates a first transmission signal. The first transmission array includes a plurality of first transmission elements configured to convert the first transmission signal into a transmission wave. The first switch supplies the first transmission signal to one of the first transmission elements in the first transmission array. The controller controls the first switch to switch the first transmission element to which the first transmission signal is supplied from a first element to a second element at a first timing.

The target object detection device according to the first aspect may further include a reception array including at least one reception element configured to receive a reflection wave resulting from a reflection of the transmission wave on a target object and convert the reflection wave into a reception signal. In this case, the target object detection device may further include processing circuitry configured to process the reception signal. The processing circuitry may be configured to extract, based on a frequency component of the reception signal, an equal-frequency reception signal based on the reflection wave from an equal-frequency surface corresponding to the frequency component. The reception array may include a plurality of reception elements, and the processing circuitry may perform beamforming based on the reception signal from each reception element, and calculate an incoming direction of the reflection wave from the target object based on the beamforming.

According to this configuration, by switching the transmission elements serving as a wave source, in a lined-up direction of the transmission elements to move the wave source, a frequency of a transmission beam is changed by Doppler effect according to a transmitting direction, and a plurality of equal-frequency surfaces (each surface has an equal frequency) stacked with each other are formed in the transmission beam. Accordingly, based on the frequency component of the reception signal, the equal-frequency surface corresponding to the concerned frequency can be defined, and an equal-frequency reception signal which is the reception signal based on the reflection wave from the equal-frequency surface can be extracted. Within a range where a reception beam, generated based on the reception signal from each reception element, and the transmission beam (equal-frequency surface) intersect with each other, a distribution of intensity data based on an intensity of the reflection waves can be calculated. As a result, by changing a directivity of the reception beam within a detection range by beamforming, the intensity data distributed three-dimensionally in the detection range can be constituted.

The second aspect of the present disclosure relates to a target object detection method. The target object detection method according to this aspect includes generating a transmission signal, and switching a supply of the transmission signal from a first element to a second element of a transmission array including a plurality of transmission elements.

According to the present disclosure, the target object detection device and the target object detection method, capable of promptly detecting a target object with a simple configuration, can be provided.

The effect and the significance of the present disclosure will be clearer from the description of the embodiments described below. Note that, each embodiment described below is merely an example of carrying out the present disclosure, and thus, the present disclosure is not limited by the description of the embodiments below.

DETAILED DESCRIPTION

Hereinafter, embodiments of the present disclosure are described with reference to the accompanying drawings.

<Basic Configuration>

First, a basic configuration of a transmission system and a reception system of a target object detection device according to this embodiment is described.

Figure 1:
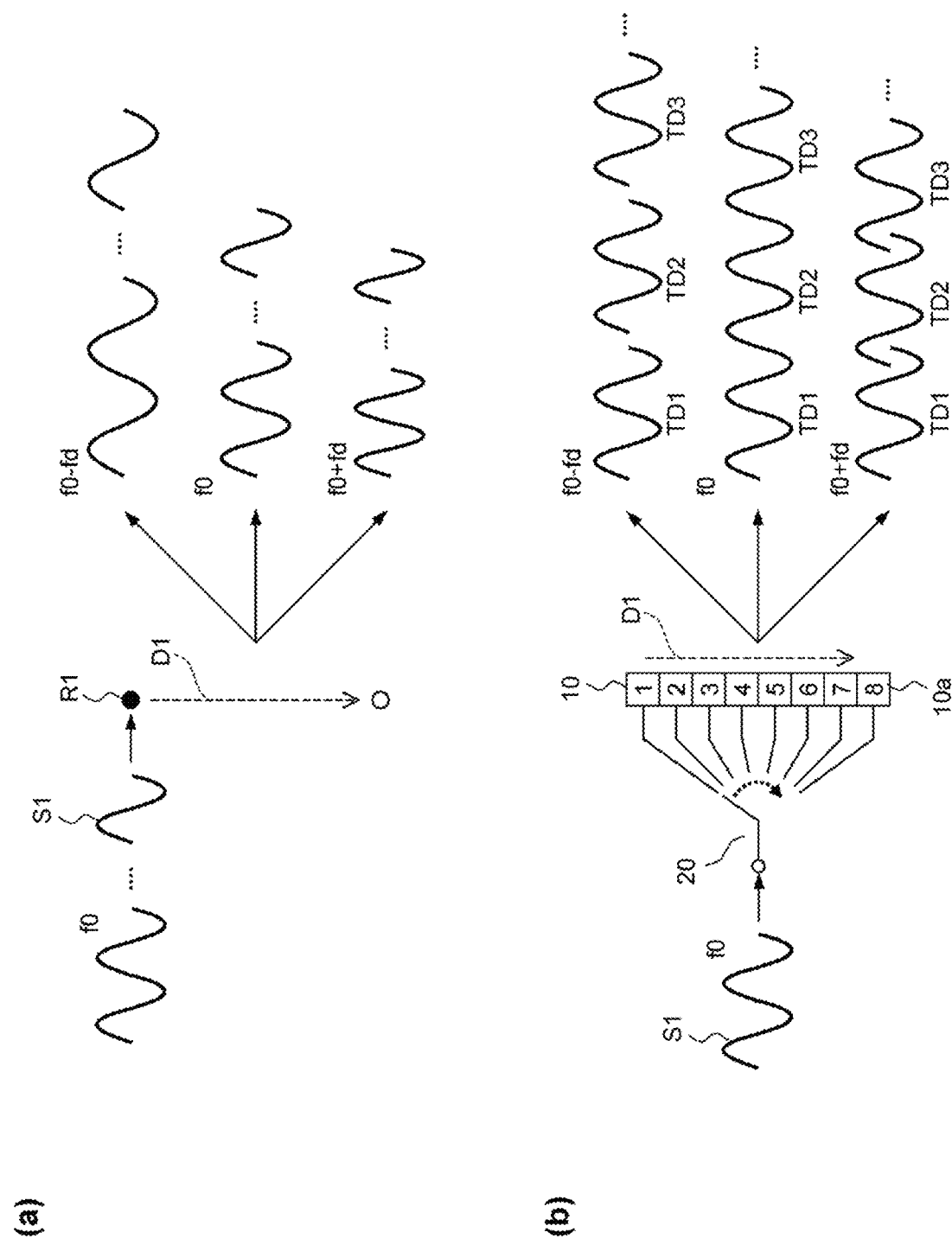
FIG. 1(a) is a diagram illustrating a configuration of a transmission system according to a reference example.
FIG. 1(b) is a diagram illustrating a configuration example for moving a wave source according to one embodiment.

FIG. 1(a) is a diagram illustrating a configuration of the transmission system according to a reference example.

According to the configuration illustrated in FIG. 1(a), a transmission signal S1 may be supplied to a wave source R1, and a transmission wave may be transmitted from the wave source R1. A carrier frequency of the transmission signal S1 may be a fixed value f0 (single frequency). When the wave source R1 is moved in a moving direction D1 in this state, the frequency is changed based on the Doppler effect in a transmission wave observed at an observation position separate from the wave source R1 by a given distance. That is, when the distance between the wave source R1 and the observation position is sufficiently large, at an observation position in front of the center position within a movable range (hereinafter, referred to as a "front observation position"), a transmission wave at the frequency f0 similar to the transmission signal S1 is generated without occurrence of the frequency change based on the Doppler effect. On the other hand, at an observation position displaced to a direction opposite from the moving direction with respect to the front observation position (hereinafter, referred to as an "upper observation position"), since the wave source R1 is moved in a direction away from the upper observation position, a transmission wave at a frequency f0−fd which is lowered from the frequency of the transmission signal S1 is generated due to the Doppler effect. "−fd" is an amount of change in the frequency from the frequency f0 of the transmission signal S1 due to the Doppler effect. Further, at an observation position displaced to a direction same as the moving direction with respect to the front observation position (hereinafter, referred to as a "lower observation position"), since the wave source R1 is moved to approach the lower observation position, a transmission wave at a frequency f0+fd which is increased from the frequency of the transmission signal S1 is generated due to the Doppler effect. "+fd" is an amount of change in the frequency from the frequency f0 of the transmission signal S1 due to the Doppler effect.

Such a change in frequency increases as an amount of displacement of each of the upper observation position and the lower observation position with respect to the front observation position becomes larger. That is, according to the displacement angle with respect to the front observation position in a depression-angle direction (the same direction as the moving direction D1) and an elevation-angle direction (the opposite direction from the moving direction D1), the frequency of the transmission wave changes in a positive or negative direction from the frequency f0. Therefore, when a reflection wave of the transmission wave is received by a reception element, magnitude of the depression angle and the elevation angle can be calculated based on a frequency component of a reception signal which is outputted from the reception element. In other words, by extracting a given frequency component from the reception signal, a reception signal at a given angular position in the depression-angle direction and the elevation-angle direction can be acquired. In this embodiment, based on this principle, the reception signal at each angular position in the depression-angle direction and the elevation-angle direction may be acquired.

FIG. 1(b) is a diagram illustrating a configuration example for moving the wave source R1.

In this configuration example, a transmission array 10 in which a plurality of transmission elements 10a are lined-up in a row may be used. Although in FIG. 1(b) eight transmission elements 10a are included in the transmission array 10 for convenience, the number of transmission elements is not limited to this. In FIG. 1(b), the transmission elements 10a are numbered in an order from above for convenience.

In this configuration example, connection of an input terminal for the transmission signal S1 to each transmission element 10a may be switched by a signal switching part 20 (which may also be referred to as a first switch). The signal switching part 20 is comprised of, for example, a demultiplexer. Here, the transmission element 10a which is a supply destination of the transmission signal S1 may be switched sequentially from above to the next transmission element 10a. Therefore, the wave source of the transmission wave may be moved in the direction D1. Also according to this configuration example, similarly to the case illustrated in FIG. 1(a), the frequency may be changed by the Doppler effect at each observation position.

However, according to this configuration example, continuity of the transmission waves at the upper observation position and the lower observation position may be interrupted due to the switching of the transmission element 10a which transmits the waves. Waveforms illustrated on the right side in FIG. 1(b) illustrate waveforms of the transmission waves at three observation positions. These three observation positions may be the same as the three observation positions (the upper observation position, the front observation position, and the lower observation position) illustrated in FIG. 1(a). TD1, TD2, and TD3 indicate the transmission waves transmitted by the transmission element 10a at the top, the transmission element 10a at the second from the top, and the transmission element 10a at the third from the top, respectively.

As illustrated in FIG. 1(b), since the transmission waves at the front observation position are not affected by the Doppler effect, similarly to the case illustrated in FIG. 1(a), the continuity of the transmission waves TD1-TD3 is ensured. On the other hand, at the upper observation position, since a phase delay occurs in the transmission waves TD1-TD3, the transmission waves TD1-TD3 separate from each other and become discrete. Further, at the lower observation position, since a phase advance is caused in the transmission waves TD1-TD3 by the Doppler effect, the transmission waves TD1-TD3 approach to each other and become discrete.

As described above, although in this configuration example, similarly to the case illustrated in FIG. 1(a), the frequency of the waveform itself is changed at each observation position as the observation position separates from the front observation position in the depression-angle direction or the elevation-angle direction, the phenomenon that the transmission waves transmitted from the respective transmission elements 10a become discrete occurs. As a result, according to this configuration example, unnecessary frequency components may be generated in the transmission waves due to the discrete transmission waves.

Figure 2:
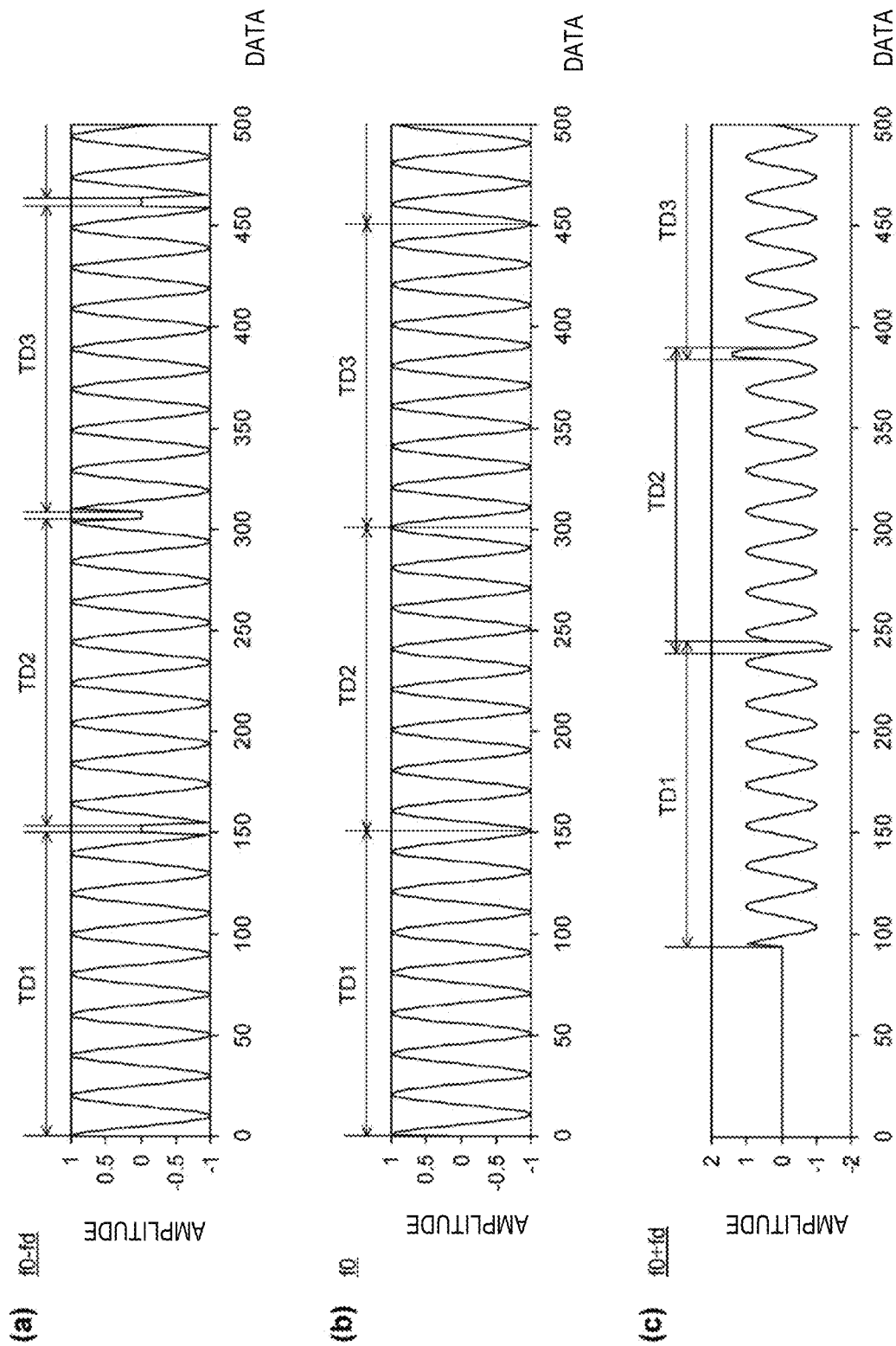
FIG. 2(a) is a chart illustrating a simulation result in which a resultant waveform of transmission waves at an upper observation position is simulated according to this embodiment.
FIG. 2(b) is a chart illustrating a simulation result in which a resultant waveform of transmission waves at a front observation position is simulated according to this embodiment.
FIG. 2(c) is a chart illustrating a simulation result in which a resultant waveform of transmission waves at a lower observation position is simulated according to this embodiment.

FIGS. 2(a) to 2(c) are charts each illustrating a simulation result in which a resultant waveform of the transmission waves at each of the three observation positions is simulated.

In this simulation, the separated distance of the front observation position from the transmission array 10 is set to a far field. Further, the upper observation position is set to a position displaced by 30° upward with respect to the front observation position, and the lower observation position is set to a position displaced by 30° downward with respect to the front observation position. FIG. 2(b) is the waveform of the transmission waves at the front observation position, and FIGS. 2(a) and 2(c) are the waveforms of the transmission waves at the upper observation position and the lower observation position, respectively. In each graph, a horizontal axis indicates a data number, and a vertical axis indicates amplitude of the transmission waves. Here, transmission signals of several cycles are supplied to each transmission element 10a, and the transmission waves are transmitted. Here, the frequency f0 of the transmission signal is set to 150 kHz.

As illustrated in FIG. 2(b), at the front observation position, the continuity of the transmission waves TD1, TD2, and TD3 is ensured. On the other hand, at the upper observation position, as illustrated in FIG. 2(a), since the waveforms of the TD1, TD2, and TD3 are separated from each other, flat waveform parts are formed therebetween. Further, at the lower observation position, as illustrated in FIG. 2(c), since the waveforms of the TD1, TD2, and TD3 overlap with each other, waveform parts with steep amplitude are formed therebetween.

Figure 3:
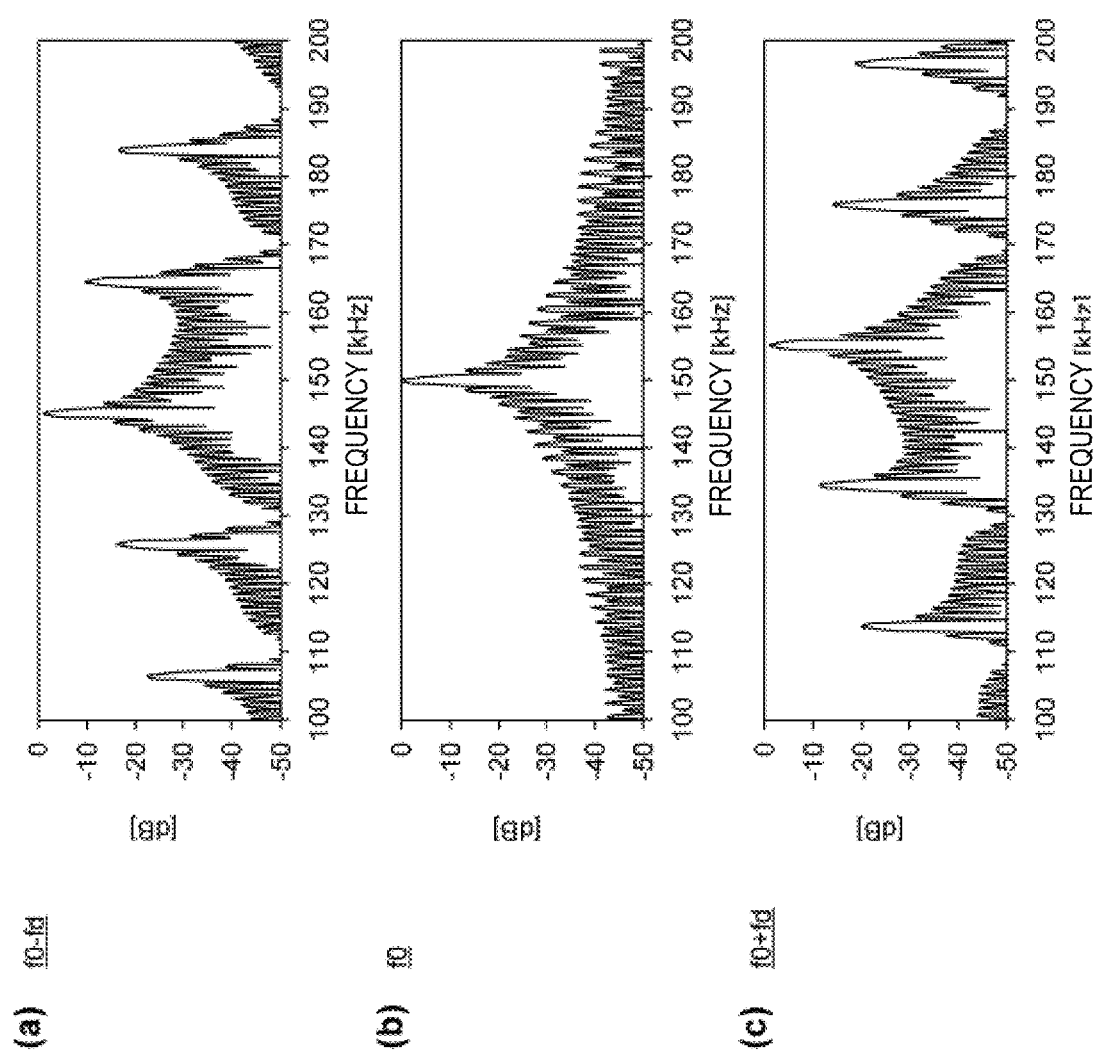
FIG. 3(a) is a chart illustrating a simulation result in which a frequency spectrum of the resultant waveform of the transmission waves at the upper observation position is simulated according to this embodiment.
FIG. 3(b) is a chart illustrating a simulation result in which a frequency spectrum of the resultant waveform of the transmission waves at the front observation position is simulated according to this embodiment.
FIG. 3(c) is a chart illustrating a simulation result in which a frequency spectrum of the resultant waveform of the transmission waves at the lower observation position is simulated according to this embodiment.

FIGS. 3(a) to 3(c) are charts illustrating a simulation result in which frequency spectra of the resultant waveforms illustrated in FIGS. 2(a) to 2(c) at the three observation positions are simulated, respectively. FIG. 3(b) illustrates the frequency spectrum of the resultant waveform at the front observation position, and FIGS. 3(a) and 3(c) illustrate the frequency spectra of the resultant waveforms at the upper observation position and the lower observation position, respectively.

As illustrated in FIG. 3(b), in the resultant waveform at the front observation position, the amplitude shows a large peak at near 150 kHz which is the frequency f0 of the transmission signal. However, in the frequency spectrum illustrated in FIG. 3(b), amplitude appears also in a wide range, other than the normal frequency point at near 150 kHz.

In addition, referring to the frequency spectrum at the upper observation position illustrated in FIG. 3(a), the peak appears near a frequency at 145 kHz which is lowered from the frequency f0 of the transmission signal due to the Doppler effect, and amplitude appears also in a wide range other than this frequency. Similarly, referring to the frequency spectrum at the lower observation position illustrated in FIG. 3(c), the peak appears near a frequency at 155 kHz which is increased from the frequency f0 of the transmission signal due to the Doppler effect, and amplitude appears also in a wide range other than this frequency.

As described above, according to the configuration example described above, at each observation position, the amplitude may appear in a wide frequency range other than the frequency caused by the Doppler effect. Such unnecessary frequency components become noise when measuring an original reflection wave for each observation position, and thus, are preferably removed as much as possible.

Figure 4:
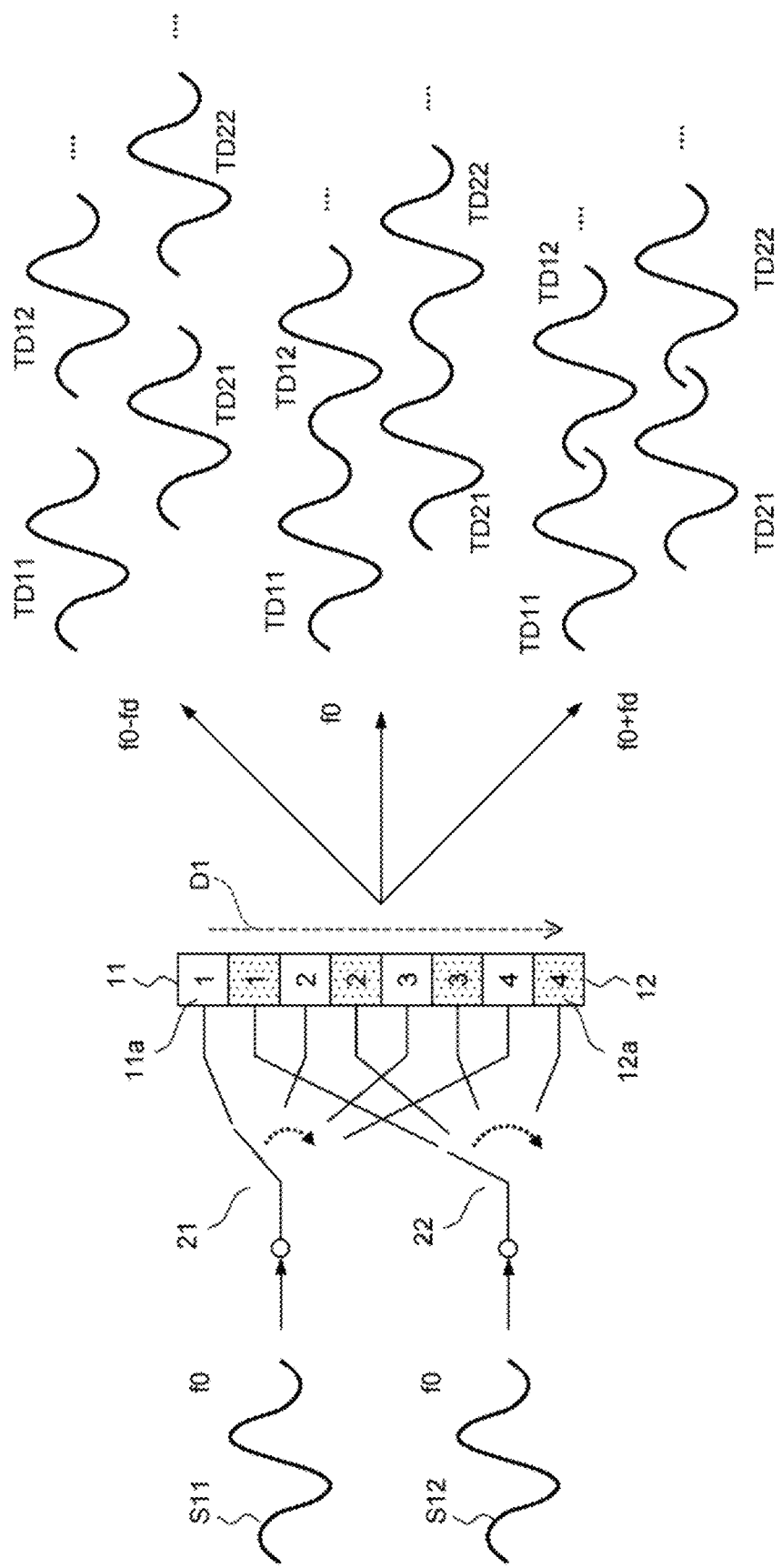
FIG. 4 is a diagram illustrating a configuration example for removing unnecessary frequency components according to this embodiment.

FIG. 4 is a diagram illustrating a configuration example for removing unnecessary frequency component.

In this configuration example, a first transmission array 11 in which a plurality of first transmission elements 11a are lined-up in a row, and a second transmission array 12 in which a plurality of second transmission elements 12a are lined-up in a row, may be used. In FIG. 4, although each of the first transmission array 11 and the second transmission array 12 includes four transmission elements for convenience, the number of transmission elements is not limited to this. Moreover, in FIG. 4, the first transmission elements 11a and the second transmission elements 12a are numbered in an order from above for convenience. The second transmission elements 12a are hatched for distinction.

In this configuration example, a second transmission element 12a may be disposed between adjacent first transmission elements 11a. The plurality of first transmission elements 11a and the plurality of second transmission elements 12a may be aligned on the same straight line.

Connection of an input terminal for a first transmission signal S11 to the first transmission element 11a may be switched by a first signal switching part 21 (which may also be referred to as a first switch). Further, connection of an input terminal for a second transmission signal S12 to the second transmission element 12a may be switched by a second signal switching part 22 (which may also be referred to as a second switch). The first signal switching part 21 and the second signal switching part 22 are comprised of, for example, demultiplexers. Here, the first transmission element 11a which is a supply destination of the first transmission signal S11 may be switched sequentially from above to the next first transmission element 11a. In addition, the second transmission element 12a which is a supply destination of the second transmission signal S12 may be switched sequentially from above to the next second transmission element 12a.

After the first transmission signal S11 is supplied to one first transmission element 11a, the second transmission signal S12 may be supplied to the second transmission element 12a next to the one first transmission element 11a at a timing when half a supplying period of the first transmission signal S11 lapsed. That is, the supply timing of the first transmission signal S11 and the supply timing of the second transmission signal S12 may be deviated from each other by half the length of the first transmission signal S11 or the second transmission signal S12. In this manner, the wave source of the transmission waves may be moved in the direction D1. As a result, also according to this configuration example, similarly to the case illustrated in FIG. 1(a), the frequency may be changed based on the Doppler effect at each observation position.

In this configuration example, a carrier frequency of the first transmission signal S11 and a carrier frequency of the second transmission signal S12 may be set to a fixed and identical value f0. However, in this configuration example, the first transmission signal S11 and the second transmission signal S12 may be modulated in a given modulation method. In detail, amplitudes of the first transmission signal S11 and the second transmission signal S12 may be modulated so as to avoid generation of unnecessary frequency components in the resultant waveform at each observation position. As a method of the amplitude modulation, a method based on a triangular window function, or a method based on a Hanning window function may be used.

Waveforms on the right side illustrated in FIG. 4 illustrate waveforms of the transmission waves at the three observation positions. The three observation positions are the same as the three observation positions (the upper observation position, the front observation position, and the lower observation position) illustrated in FIG. 1(b). TD11 and TD12 indicate the transmission waves transmitted by the first transmission elements 11a of the first transmission array 11 at the top and the second from above, respectively. Further, TD21 and TD22 indicate the transmission waves transmitted by the second transmission elements 12a of the second transmission array 12 at the top and the second from above, respectively.

In this configuration example, similarly to the case illustrated in FIG. 1(b), the transmission waves TD11 and TD12 at the upper observation position are separated from each other. However, since the transmission wave TD21 exists at this separated part, the flat part does not appear at the concerned part in the resultant waveform where the transmission waves are synthesized. Therefore, the generation of unnecessary frequency components based on the flat part is suppressed.

Moreover, in this configuration example, similarly to the case illustrated in FIG. 1(b), the transmission waves TD11 and TD12 at the lower observation position partially overlap with each other. However, since the transmission wave TD21 exists at this overlapping part, the steep amplitude part does not appear at the concerned part in the resultant waveform where the transmission waves are combined. Therefore, the generation of unnecessary frequency components based on the steep amplitude part is suppressed.

Figure 5:
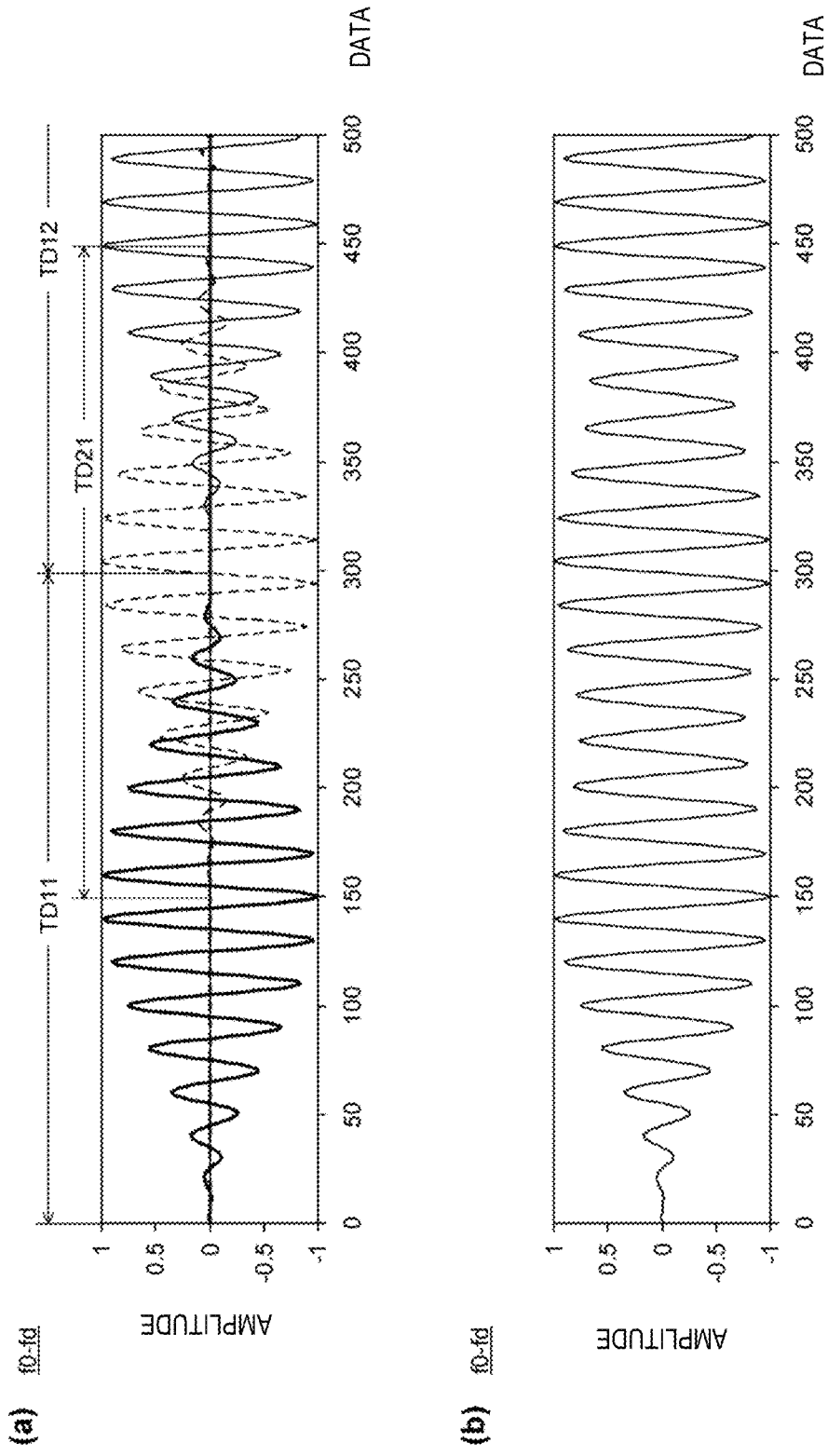
FIG. 5(a) is a chart illustrating a simulation result in which states of three transmission waves at the upper observation position are simulated according to this embodiment.
FIG. 5(b) is a chart illustrating a simulation result in which a resultant waveform synthesizing the three transmission waves illustrated in FIG. 5(a) is simulated according to this embodiment.

FIG. 5(a) is a chart illustrating a simulation result in which states of the transmission waves TD11, TD12, and TD21 at the upper observation position are simulated. Further, FIG. 5(b) is a chart illustrating a simulation result in which the resultant waveform synthesizing the transmission waves TD11, TD12, and TD21 illustrated in FIG. 5(a) is simulated.

The vertical axis and the horizontal axis in FIGS. 5(a) and 5(b) are similar to the vertical axis and the horizontal axis in FIG. 2(a), respectively. The upper observation position is set similarly to the case illustrated in FIG. 2(a). In FIG. 5(a), the transmission waves TD11 and TD12 are illustrated by solid lines, and the transmission wave TD21 is illustrated by a broken line.

In this simulation, the first transmission signal S11 is modulated so that the amplitude becomes the largest at the middle of the supplying period to each first transmission element 11a, and gradually approaches zero at a start timing and an end timing of the supplying period. The second transmission signal S12 is modulated similarly. The frequencies of the first transmission signal S11 and the second transmission signal S12 are set to be identical. The length of the supplying period of the first transmission signal S11 to the first transmission element 11a and the length of the supplying period of the second transmission signal S12 to the second transmission element 12a are identical with each other.

As illustrated in FIG. 5(b), although the amplitude slightly changes in the resultant waveform at the upper observation position, there is no flat part in the resultant waveform as shown in the graph in FIG. 2(a), and the continuity of the resultant waveform is ensured.

Figure 6:
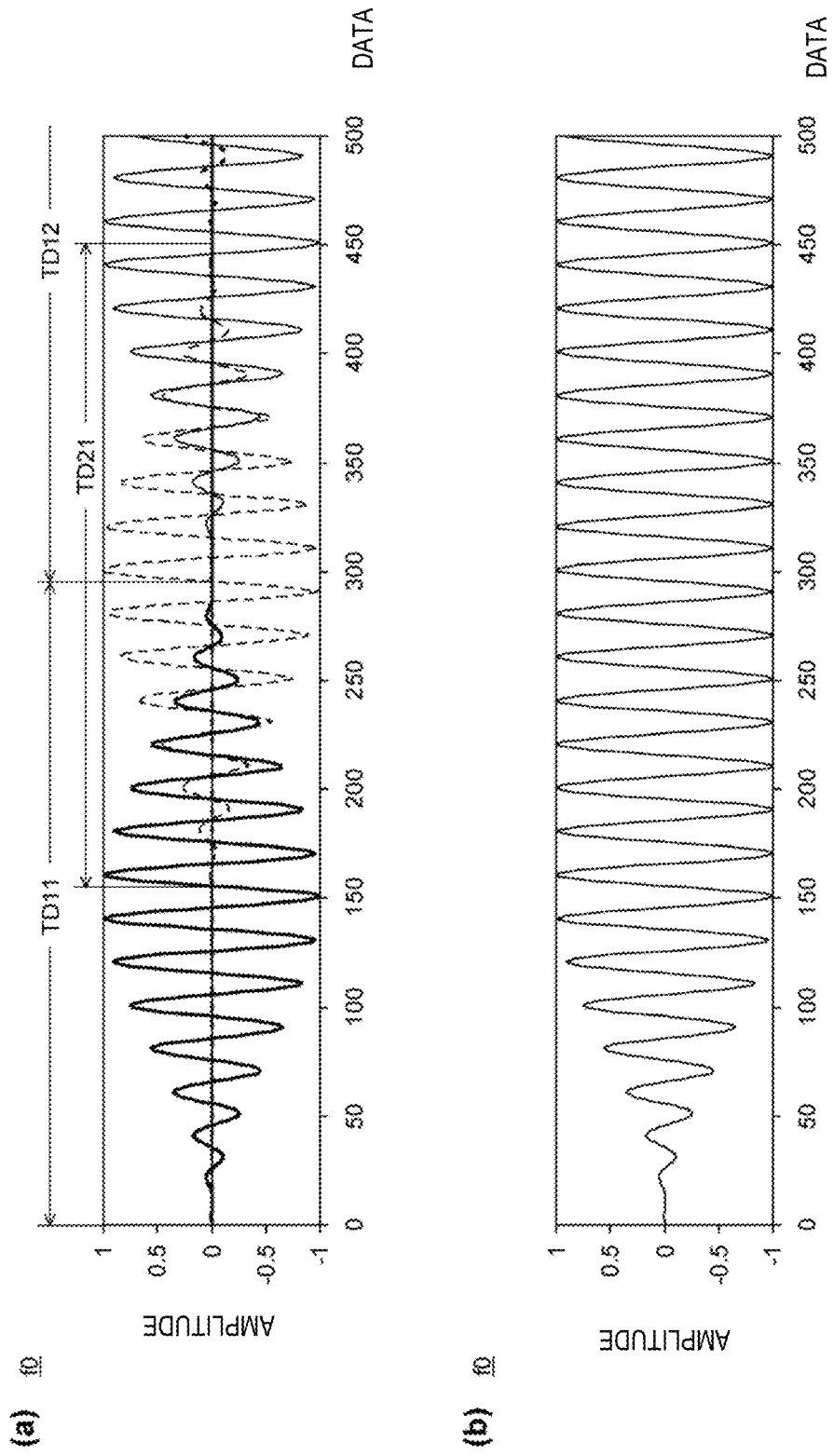
FIG. 6(a) is a chart illustrating a simulation result in which states of three transmission waves at the front observation position are simulated according to this embodiment.
FIG. 6(b) is a chart illustrating a simulation result in which a resultant waveform synthesizing the three transmission waves illustrated in FIG. 6(a) is simulated according to this embodiment.

FIG. 6(a) is a chart illustrating a simulation result in which states of the transmission waves TD11, TD12, and TD21 at the front observation position are simulated. Further, FIG. 6(b) is a chart illustrating a simulation result in which the resultant waveform synthesizing the transmission waves TD11, TD12, and TD21 illustrated in FIG. 6(a) is simulated.

The vertical axis and the horizontal axis in FIGS. 6(a) and 6(b) are similar to the vertical axis and the horizontal axis in FIGS. 5(a) and 5(b), respectively. The front observation position is set similarly to the case illustrated in FIG. 2(b). In FIG. 6(a), the transmission waves TD11 and TD12 are illustrated by solid lines, and the transmission wave TD21 is illustrated by a broken line. Also in this simulation, the first transmission signal S11 and the second transmission signal S12 similar to the simulation illustrated in FIGS. 5(a) and 5(b) are used.

As illustrated in FIG. 6(b), in the resultant waveform at the front observation position, the amplitude is maintained to be substantially fixed similarly to the case illustrated in FIG. 2(b), and the continuity of the resultant waveform is ensured.

Figure 7:
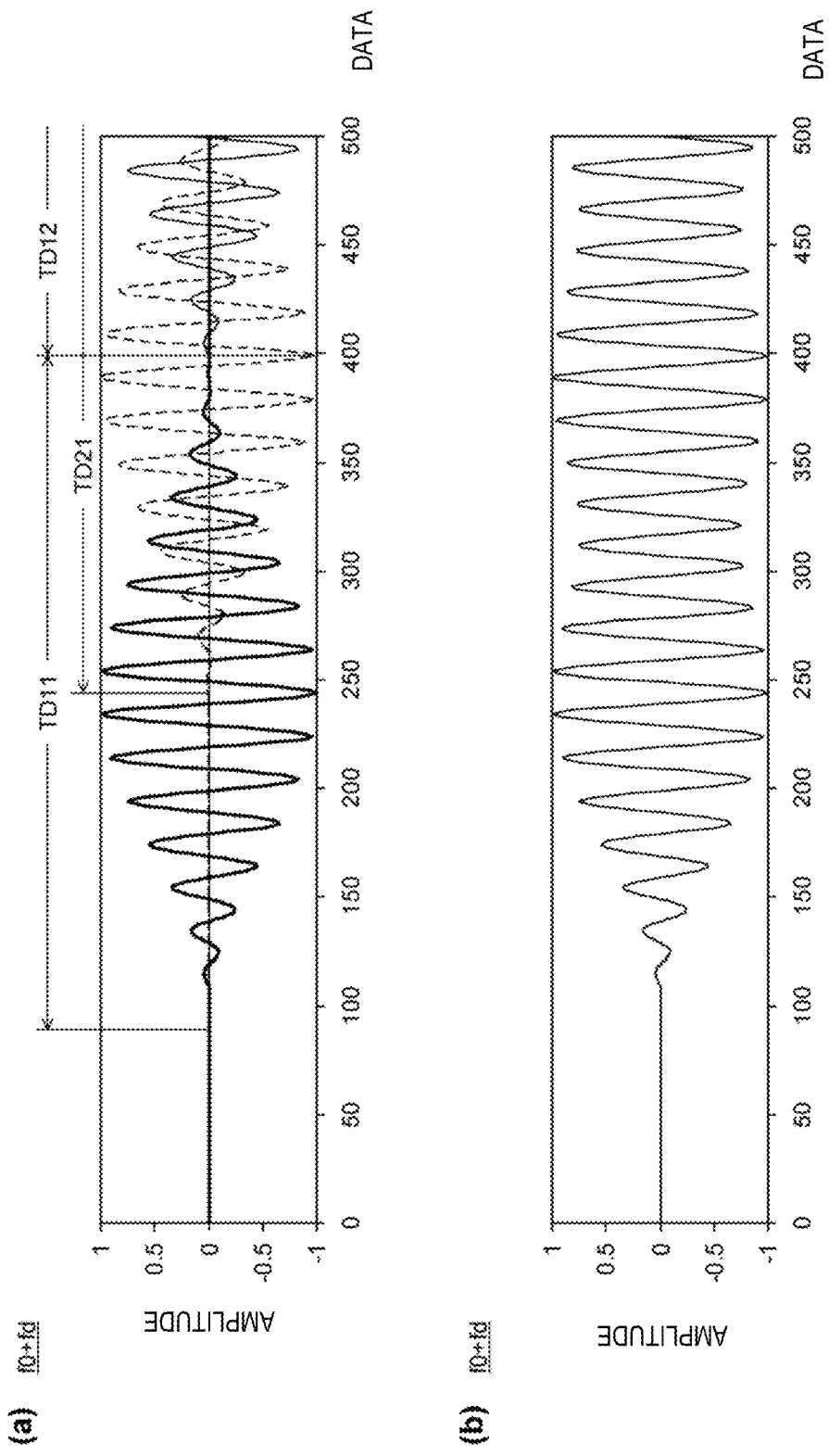
FIG. 7(a) is a chart illustrating a simulation result in which states of three transmission waves at the lower observation position are simulated according to this embodiment.
FIG. 7(b) is a chart illustrating a simulation result in which a resultant waveform synthesizing the three transmission waves illustrated in FIG. 7(a) is simulated according to this embodiment.

FIG. 7(a) is a chart illustrating a simulation result in which states of the transmission waves TD11, TD12, and TD21 at the lower observation position are simulated. Further, FIG. 7(b) is a chart illustrating a simulation result in which the resultant waveform synthesizing the transmission waves TD11, TD12, and TD21 illustrated in FIG. 7(a) is simulated.

The vertical axis and the horizontal axis in FIGS. 7(a) and 7(b) are similar to the vertical axis and the horizontal axis in FIGS. 5(a) and 5(b), respectively. The lower observation position is set similarly to the case illustrated in FIG. 2(c). In FIG. 7(a), the transmission waves TD11 and TD12 are illustrated by solid lines, and the transmission wave TD21 is illustrated by a broken line. Also in this simulation, the first transmission signal S11 and the second transmission signal S12 similar to the simulation illustrated in FIGS. 5(a) and 5(b) are used.

As illustrated in FIG. 7(b), although the amplitude slightly changes in the resultant waveform at the lower observation position, there is no steep amplitude part in the resultant waveform as shown in the graph in FIG. 2(c), and the continuity of the resultant waveform is ensured.

Figure 8:
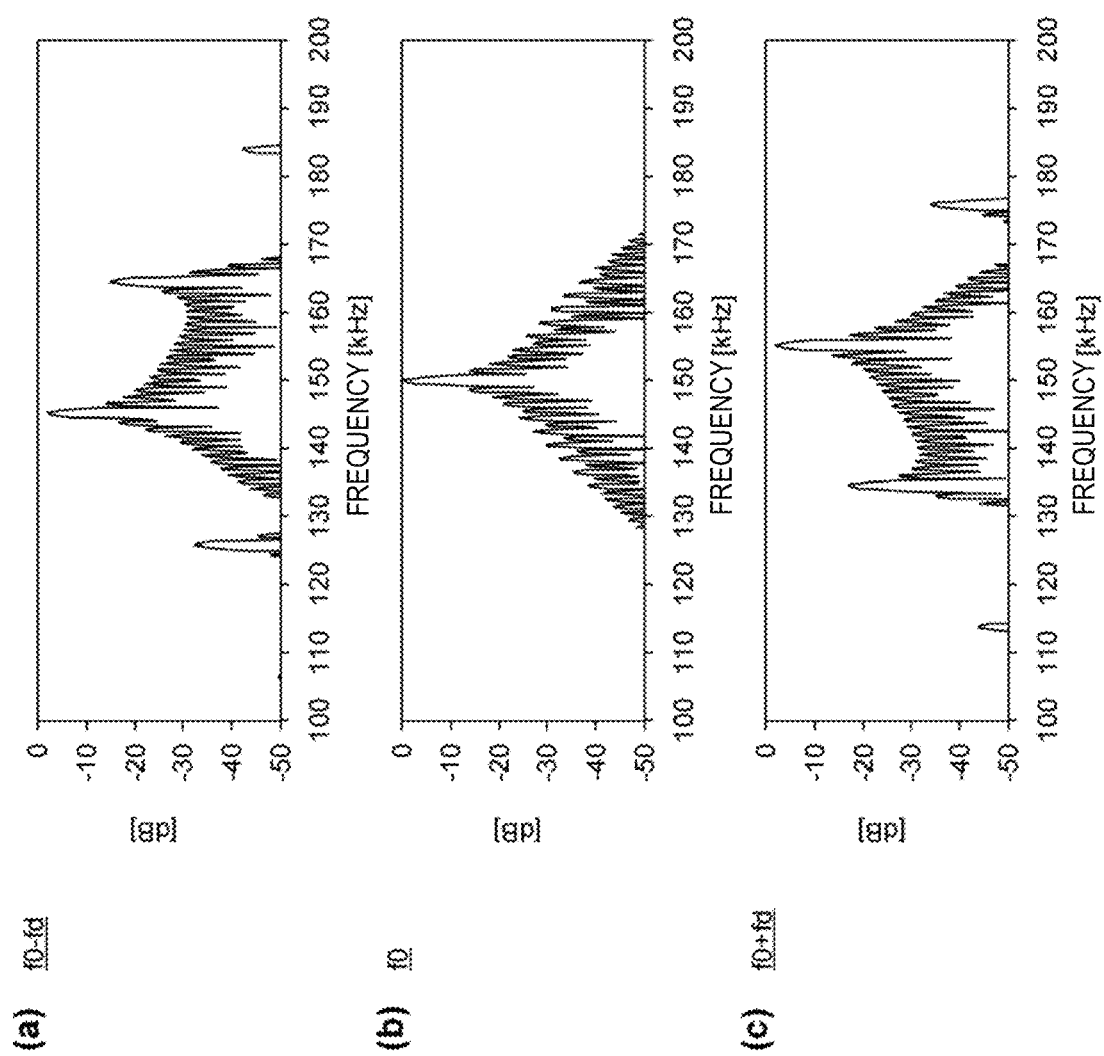
FIG. 8(a) is a chart illustrating a simulation result in which a frequency spectrum of the resultant waveform illustrated in FIG. 5(b) is simulated.
FIG. 8(b) is a chart illustrating a simulation result in which a frequency spectrum of the resultant waveform illustrated in FIG. 6(b) is simulated.
FIG. 8(c) is a chart illustrating a simulation result in which a frequency spectrum of the resultant waveform illustrated in FIG. 7(b) is simulated.

FIGS. 8(a) to 8(c) are charts illustrating a simulation result in which frequency spectra of the resultant waveforms illustrated in FIG. 5(b), FIG. 6(b), and FIG. 7(b) are simulated, respectively.

As illustrated in FIG. 8(a), similarly to the frequency spectrum illustrated in FIG. 3(a), the frequency spectrum of the resultant waveform at the upper observation position has a large peak near 145 kHz which is the frequency shifted based on the Doppler effect. Moreover, compared to the frequency spectrum illustrated in FIG. 3(a), unnecessary peaks are removed in the frequency spectrum illustrated in FIG. 8(a), and the frequency range where the amplitude appears is limited to a significantly narrow range centering around 150 kHz.

As illustrated in FIG. 8(b), similarly to the frequency spectrum illustrated in FIG. 3(b), the frequency spectrum of the resultant waveform at the front observation position has a large peak near 150 kHz which is similar to the frequency of the first transmission signal S11 and the second transmission signal S12. Moreover, compared to the frequency spectrum illustrated in FIG. 3(b), in the frequency spectrum illustrated in FIG. 8(b), the frequency range where the amplitude appears is limited to a significantly narrow range centering around 150 kHz.

As illustrated in FIG. 8(c), similarly to the frequency spectrum illustrated in FIG. 3(c), the frequency spectrum of the resultant waveform at the lower observation position has a large peak near 155 kHz which is the frequency shifted based on the Doppler effect. Moreover, compared to the frequency spectrum illustrated in FIG. 3(c), unnecessary peaks are removed in the frequency spectrum illustrated in FIG. 8(c), and the frequency range where the amplitude appears is limited to a significantly narrow range centering around 150 kHz.

As described above, by using the configuration illustrated in FIG. 4, unnecessary frequency component of the transmission waves, which may be noise at each observation position, may effectively be removed. As a result, the reflection waves can be measured accurately.

Meanwhile, the change in frequency based on the Doppler effect as illustrated in FIG. 1(b) and FIG. 4 occurs not only at the front observation position, the upper observation position, and the lower observation position described above, but also at other observation positions within a range where the transmission waves are transmitted. However, since a positional relation of each observation position with respect to the wave source varies, the way of occurrence of the Doppler effect varies at every observation position. That is, observation positions in a plane having a given elevation or depression angle with respect to the front direction have mutually different heights from a horizontal plane including the front direction. Therefore, when the wave source is moved, the observation positions approach or separate to/from the wave source at speeds different from each other. As a result, a plane in which the frequency of the transmission waves becomes equal is not the flat plane having the given elevation or depression angle with respect to the front direction, but a curved surface formed by curving the flat plane in a circumferential direction.

Figure 9:
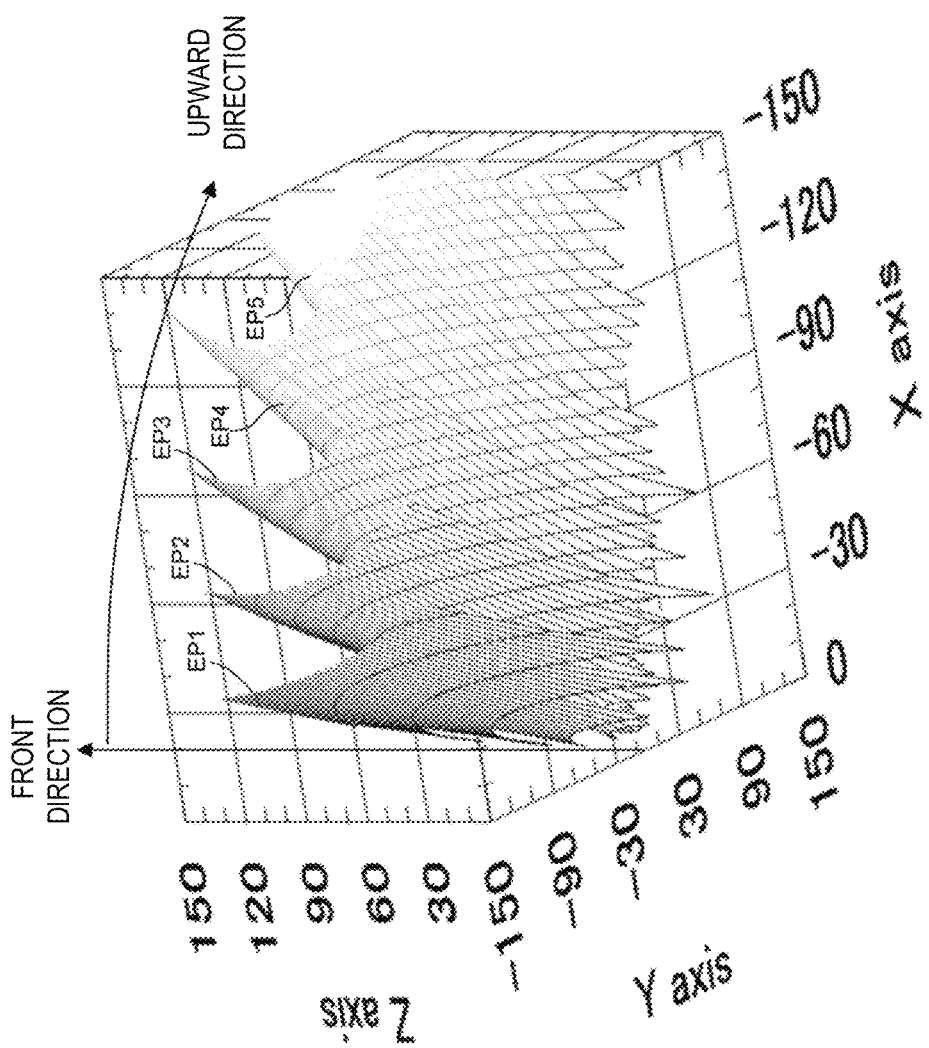
FIG. 9 is a diagram illustrating a simulation result in which equal-frequency surfaces are simulated according to this embodiment.

FIG. 9 is a diagram illustrating a simulation result in which a surface where the frequency becomes equal (hereinafter, referred to as an "equal-frequency surface") is simulated.

In FIG. 9, the unit of each axis is "meter." The transmission array is disposed at the middle position in a Y-axis direction (a position where the distance becomes zero) to extend in an X-axis direction. The transmission waves are transmitted in a Z-axis direction from the center position in Y-axis direction. That is, a direction from the center position in the Y-axis direction to the Z-axis direction is the front direction.

In FIG. 9, equal-frequency surfaces EP1-EP5 within an upper range with respect to the front direction are illustrated. The equal-frequency surfaces EP1, EP2, EP3, EP4, and EP5 are frequency surfaces at f0−fd1, f0−fd2, f0−fd3, f0−fd4, and f0−fd5, respectively. "f0" is the frequency in the front direction and equal to the frequency of the transmission signal supplied to the transmission element. A relationship between fd1 to fd5 is fd1<fd2<fd3<fd4<fd5.

Although in FIG. 9 five equal-frequency surfaces EP1 to EP5 are illustrated for convenience, many equal-frequency surfaces exist between the equal-frequency surfaces EP1 to EP5. For example, frequencies between the equal-frequency surfaces EP1 and EP2 continuously transit from f0−fd1 to f0−fd2. By inversing the equal-frequency surfaces EP1 to EP5 symmetrically with respect to a Y-Z plane, equal-frequency surfaces within a lower range with respect to the front direction are formed.

Figure 10:
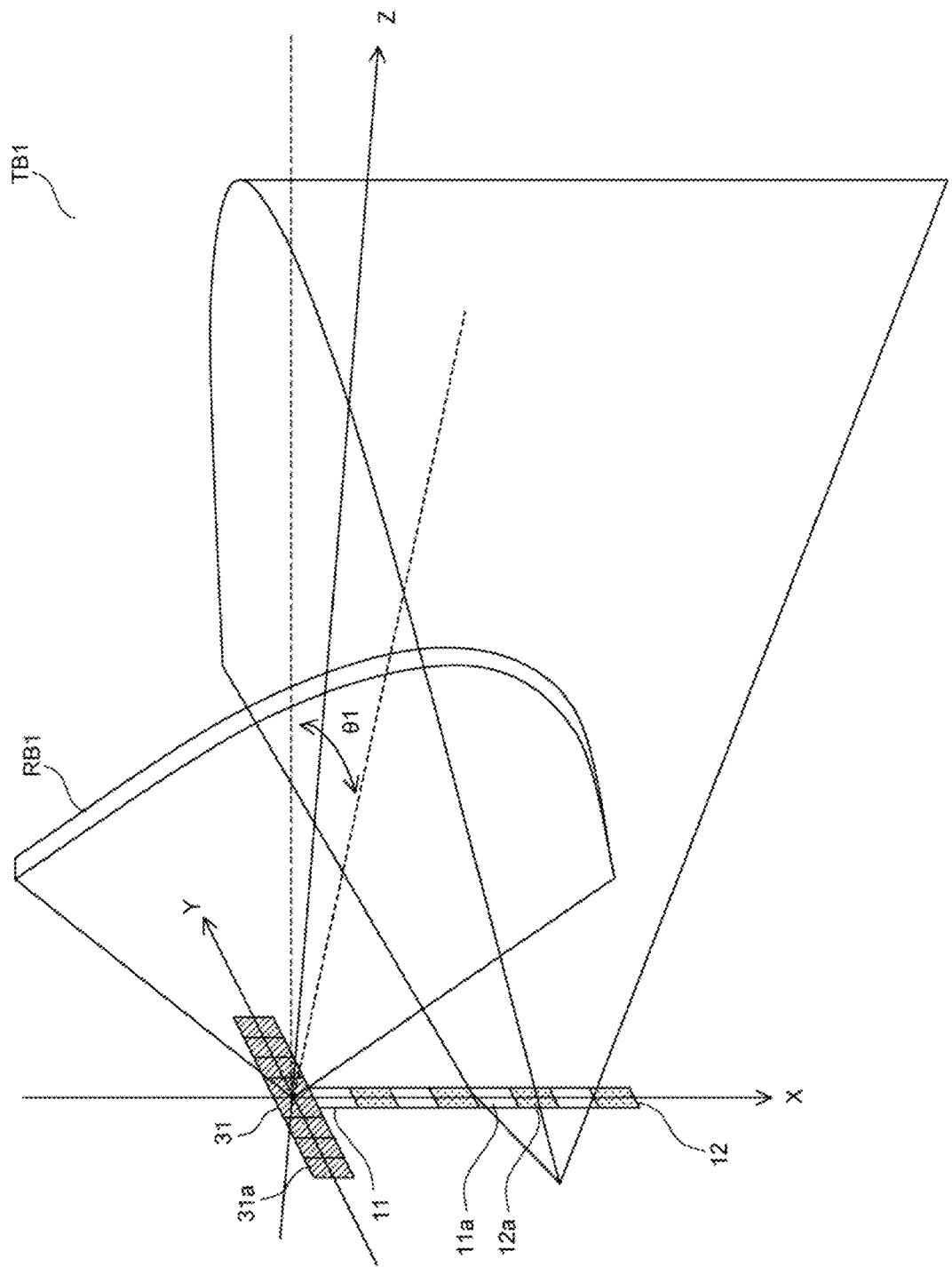
FIG. 10 is a diagram schematically illustrating a configuration example of a transmission system and a reception system according to this embodiment.

FIG. 10 is a diagram schematically illustrating a configuration example of the transmission system and a reception system.

In this configuration, other than the configuration of the transmission system illustrated in FIG. 4, a reception array 31 having a plurality of reception elements 31a may be provided as a reception system. Similarly to FIG. 4, the configuration of the transmission system may include the first transmission array 11 and the second transmission array 12 which are disposed along an X-axis. The reception array 31 may be disposed immediately above the first transmission array 11. In this configuration example, a direction in which the reception elements 31a are aligned may be perpendicular to the direction in which the first transmission elements 11a and the second transmission elements 12a are aligned.

By actuating the first transmission elements 11a of the first transmission array 11 and the second transmission elements 12a of the second transmission array 12 in the method described with reference to FIG. 4, a transmission beam TB1 may be formed forward (Z-axis direction) of the first transmission array 11 and the second transmission array 12.

That is, when the first transmission signal S11 is supplied to the first transmission element 11a, the transmission waves may be transmitted from the first transmission element 11a having a comparatively wide directivity. Similarly, when the second transmission signal S12 is supplied to the second transmission element 12a, the transmission waves may be transmitted from the second transmission element 12a having a comparatively wide directivity. When the first transmission signal S11 and the second transmission signal S12 for one scanning are supplied to the first transmission elements 11a of the first transmission array 11 and the second transmission elements 12a of the second transmission array 12 sequentially from above, a range where all the transmission waves transmitted from the respective transmission elements are stacked on top of each other may be a formation range of the transmission beam TB1. In this formation range, many equal-frequency surfaces may be formed as described above with reference to FIG. 9.

By performing a phase control (beamforming) to a reception signal outputted from each reception element 31a, a reception beam RB1 with a narrow width may be formed in the circumferential direction centering on the X-axis. Accordingly, a reception signal within a range where the reception beam RB1 and the transmission beam TB1 intersect with each other may be extracted. By the reception beam RB1 being rotated in a θ1-direction centering on the X-axis by the phase control, the reception signal at each rotating position may be extracted. The rotating position of the reception beam RB1 may define an incoming direction, in the horizontal direction, of the reflection wave which is a reflection of the transmission wave from a target object. Moreover, depending on the frequency of the reception signal, the equal-frequency surface (see FIG. 9) at which the reflection wave is generated may be defined.

Therefore, by extracting the reception signal at a frequency corresponding to each equal-frequency surface from the reception signal extracted by the reception beam RB1, and plotting on each equal-frequency surface an intensity of the extracted reception signal, a distribution of intensity data of the reception signal in the range where the reception beam RB1 and the transmission beam TB1 intersect with each other may be obtained. Then, when the reception beam RB1 is rotated in the horizontal direction within a detection range, by obtaining the distribution of the intensity data at each rotating position, intensity data (volume data) distributed three dimensionally in the entire detection range in the horizontal direction and the vertical direction can be acquired. By turning the intensity data (volume data) into an image, an image indicative of a state of the target object in the detection range can be obtained.

<Concrete Configuration>

Figure 11:
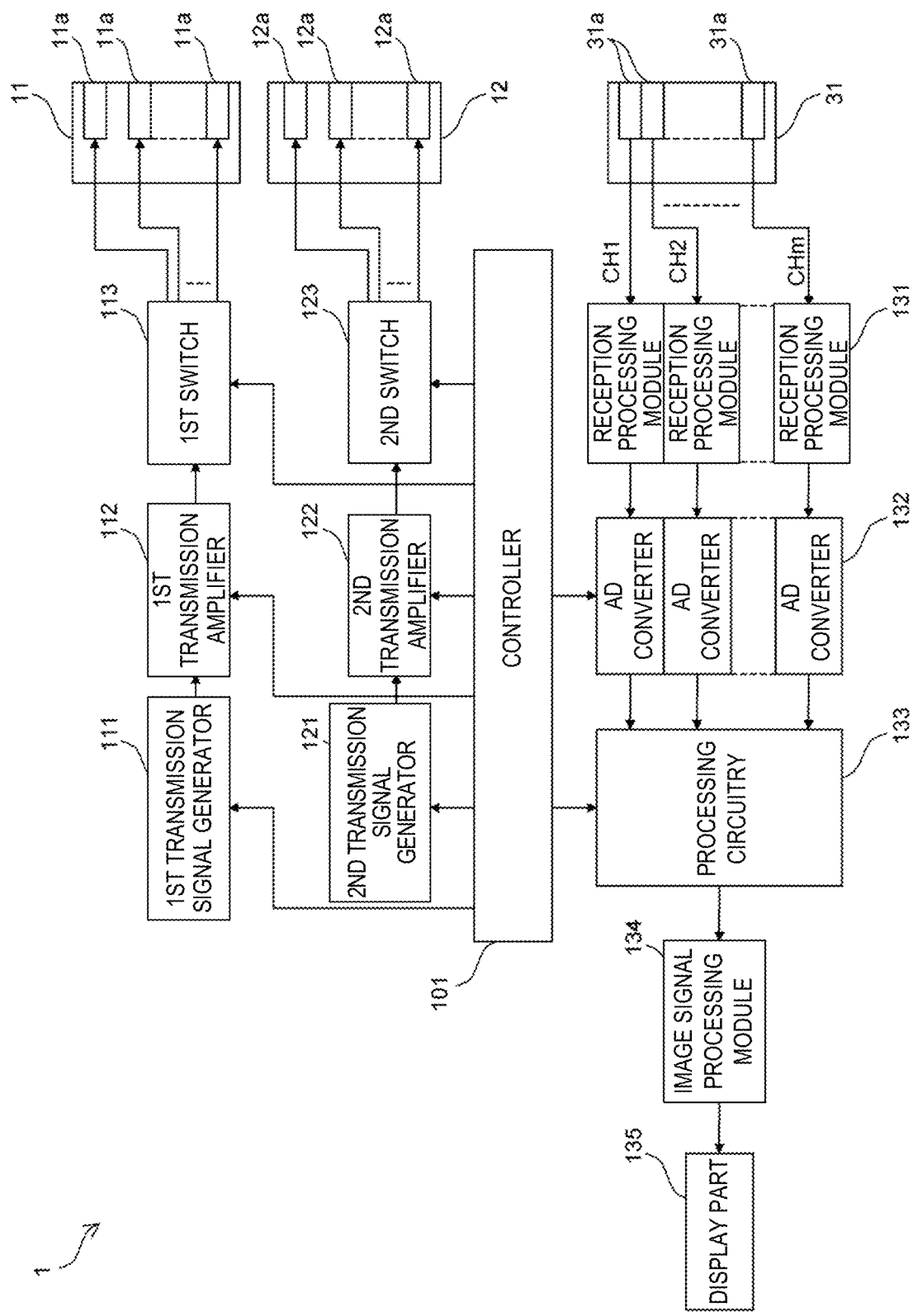
FIG. 11 is a block diagram illustrating a concrete configuration of a target object detection device according to this embodiment.

FIG. 11 is a block diagram illustrating a concrete configuration of a target object detection device 1.

The target object detection device 1 may include the first transmission array 11 and the second transmission array 12 as the transmission system. The configuration of the first transmission array 11 and the second transmission array 12 may be similar to FIG. 10. The target object detection device 1 may be provided with a first transmission signal generating module 111 (which may also be referred to as a first transmission signal generator), a first transmission amplifier 112, and a first signal switching part 113 (which may also be referred to as a first switch) as a configuration to supply the first transmission signal S11 to each first transmission element 11a of the first transmission array 11. The target object detection device 1 may further be provided with a second transmission signal generating module 121 (which may also be referred to as a second transmission signal generator), a second transmission amplifier 122, and a second signal switching part 123 (which may also be referred to as a second switch) as a configuration to supply the second transmission signal S12 to each second transmission element 12a of the second transmission array 12.

The first transmission signal generating module 111 may generate the first transmission signal S11 according to control from a control part 101 (which may also be referred to as a controller). The first transmission signal S11 may have a waveform with a fixed frequency and a modulated amplitude. The first transmission signal S11 may be set to have a waveform similarly to the transmission wave TD11 illustrated in FIG. 6(a). The first transmission amplifier 112 may amplify the first transmission signal S11 inputted from the first transmission signal generating module 111 according to the control from the control part 101. The first signal switching part 113 may supply the first transmission signal S11 sequentially to the plurality of first transmission elements 11a included in the first transmission array 11 according to the control from the control part 101. The first signal switching part 113 may have a similar structure to the first signal switching part 21 illustrated in FIG. 4. The first signal switching part 113 is comprised of, for example, a demultiplexer.

The second transmission signal generating module 121 may generate the second transmission signal S12 according to the control from the control part 101. The second transmission signal S12 may have a waveform with a fixed frequency and a modulated amplitude. The second transmission signal S12 may be set to have a waveform similarly to the transmission wave TD21 illustrated in FIG. 6(a). The second transmission signal S12 may be a signal similar to the first transmission signal S11. The second transmission amplifier 122 may amplify the second transmission signal S12 inputted from the second transmission signal generating module 121 according to the control from the control part 101. The second signal switching part 123 may supply the second transmission signal S12 sequentially to the plurality of second transmission elements 12a included in the second transmission array 12 according to the control from the control part 101. The second signal switching part 123 may have a similar structure to the second signal switching part 22 illustrated in FIG. 4. The second signal switching part 123 is comprised of, for example, a demultiplexer.

The control part 101 may be provided with an arithmetic processing circuit such as a CPU (Central Processing Unit), and a storage medium such as a ROM (Read Only Memory), a RAM (Random Access Memory), and/or a hard disk. The control part 101 may be comprised of an integrated circuit, such as an FPGA (Field-Programmable Gate Array). The control part 101 may control the first signal switching part 113 and the second signal switching part 123 so that the supplying period of the second transmission signal S12 to the second transmission element 12a adjacent to the first transmission element 11a is delayed by half the supplying period of the first transmission signal S11 to the first transmission element 11a. According to this, the transmission waves as illustrated in FIGS. 5(b), 6(b), and 7(b) may be transmitted, and the equal-frequency surfaces (see FIG. 9) may be formed in the transmission beam TB1.

The target object detection device 1 may be provided with the reception array 31 as the reception system. A structure of the reception array 31 may be similar structure to FIG. 10. "m" reception elements 31a may be arrayed in the reception array 31. The reception signal may be outputted from the reception elements 31a to channels CH1 to CHm corresponding to the reception elements 31a.

As a configuration to process the reception signal outputted from the reception elements 31a of the reception array 31 to generate a detection image, the target object detection device 1 may be provided with a plurality of reception processing modules 131, a plurality of AD converters 132, a reception signal processing module 133 (which may also be referred to as processing circuitry), and an image signal processing module 134.

The plurality of reception processing modules 131 may be connected to the channels CH1 to CHm, respectively. Each reception processing module 131 may process the inputted reception signal, for example, to remove an unnecessary band, to amplify the reception signal to a level suitable for AD conversion, and to remove signal components within a band at half a sampling cycle of the AD conversion or higher. The plurality of AD converters 132 may be provided so as to correspond to the plurality of reception processing modules 131. Each AD converter 132 may convert the analog reception signal inputted from the corresponding reception processing module 131 to a digital signal at a given sampling cycle.

The reception signal processing module 133 may process the reception signal of the channels CH1 to CHm inputted from the plurality of AD converters 132, respectively, to calculate the intensity data (volume data) of the reception signal distributed three-dimensionally in the detection range. The reception signal processing module 133 may be comprised of a single integrated circuit (e.g., an FPGA) together with the control part 101.

The image signal processing module 134 may process the intensity data (volume data) inputted from the reception signal processing module 133 so as to generate image data for creating the image of the state of the target object in the detection range. The image signal processing module 134 is comprised of, for example, a CPU. A display part 135 is comprised of a monitor etc., and may display the detection image corresponding to the image data inputted from the image signal processing module 134.

Figure 12:
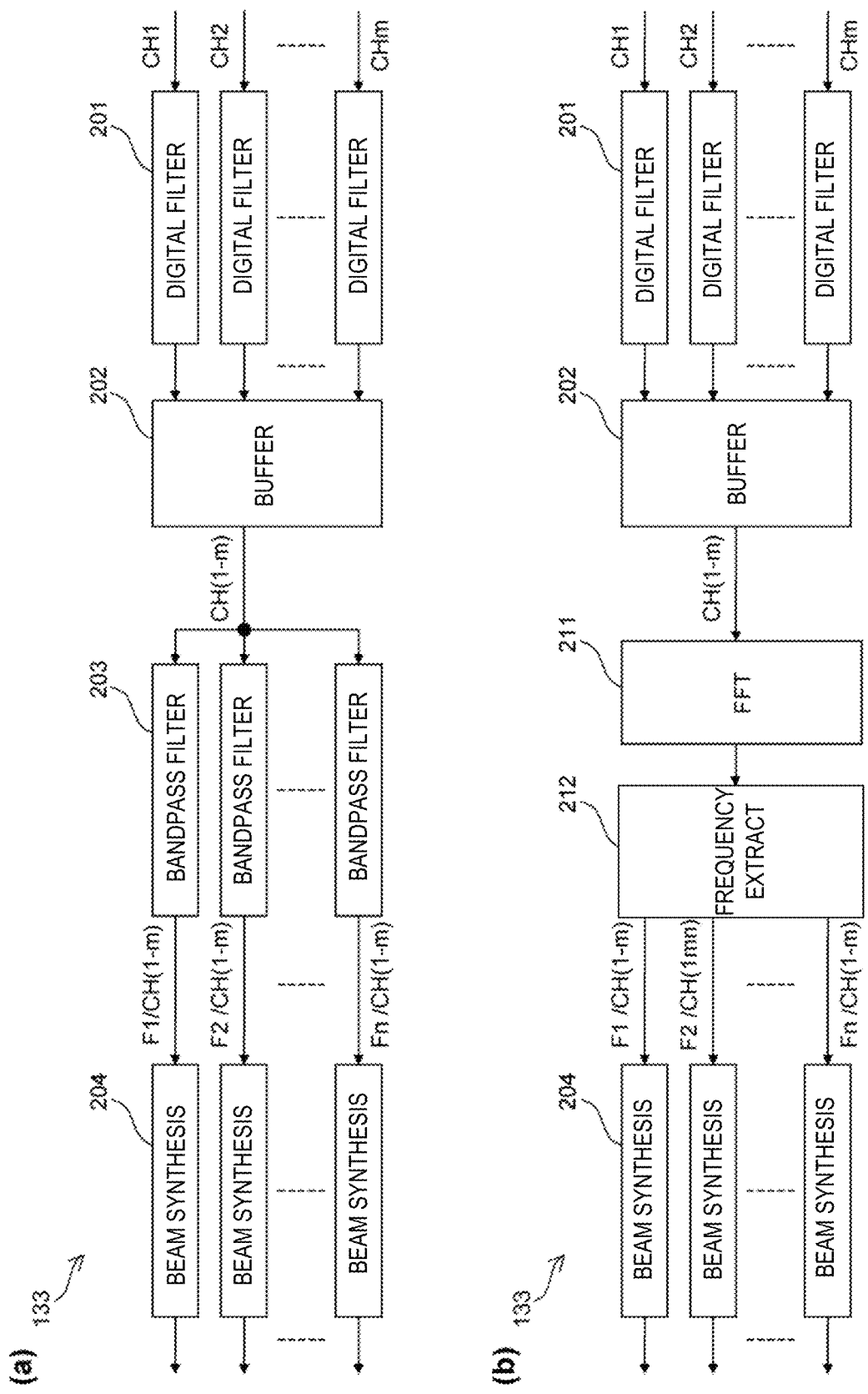
FIG. 12(a) is a functional block diagram illustrating a configuration example of a reception signal processing module according to this embodiment.
FIG. 12(b) is a functional block diagram illustrating another configuration example of the reception signal processing module according to this embodiment.

FIG. 12(a) is a functional block diagram of a configuration example of the reception signal processing module 133.

The reception signal processing module 133 may be provided with an arithmetic processing circuit and a storage medium. The reception signal processing module 133 may implement functions of the respective functional blocks illustrated in FIG. 12(a) by executing a program stored in the storage medium. A part of the functions illustrated in FIG. 12(a) may be implemented by hardware instead of software.

The reception signal processing module 133 may be provided with a plurality of digital filters 201, a buffer 202, a plurality of bandpass filters 203, and a plurality of beam synthesizing modules 204.

The plurality of digital filters 201 may be provided so as to correspond to the plurality of AD converters 132 illustrated in FIG. 11. Each digital filter 201 may be a filter having a filtering function sharper than that of the reception processing module 131 illustrated in FIG. 11, and may remove a signal in an unnecessary band from the reception signal.

The buffer 202 may temporarily store the reception signal of the channels CH1 to CHm outputted from the plurality of digital filters 201. The buffer 202 may store the reception signal (hereinafter, referred to as "one-scanning reception signal") from a start of the actuation of the plurality of first transmission elements 11a of the first transmission array 11 and the plurality of the second transmission elements 12a of the second transmission array 12 from the top to the bottom (this actuation is referred to as "scanning"), until the reflection wave from the maximum distance within the detection range is received by the reception array 31, for a plurality of scannings in a chronological order. The buffer 202 may sequentially supply the one-scanning reception signal to each of the plurality of bandpass filters 203. When the buffer 202 supplies the one-scanning reception signal to the plurality of bandpass filters 203, the buffer 202 may delete the one-scanning reception signal.

The plurality of bandpass filters 203 may extract, from the inputted one-scanning reception signal of the channels CH1 to CHm, the frequency components (equal-frequency reception signals) at frequencies F1 to Fn, respectively. The frequencies F1 to Fn of the bandpass filters 203 may define the equal-frequency surfaces illustrated in FIG. 9, respectively. That is, the equal-frequency surfaces can be defined by the number of the bandpass filters 203. As the number of the bandpass filters 203 increases, a resolution of the reception signal in a stacking direction of the equal-frequency surfaces may be increased. Each bandpass filter 203 may extract a frequency component (equal-frequency reception signal) at a frequency Fk set to itself from the one-scanning reception signal of the channels CH1 to CHm, and supply it to the beam synthesizing module 204.

The plurality of beam synthesizing modules 204 may be provided so as to correspond to the plurality of bandpass filters 203. The beam synthesizing module 204 may form the reception beam RB1 by beamforming based on a phase control or a delay control, and isolate the equal-frequency reception signal at a given resolution in the θ1-direction illustrated in FIG. 10. Accordingly, the equal-frequency reception signal within a range where the reception beam RB1 intersects with the equal-frequency surface defined by the bandpass filter 203 may be acquired. That is, the beam synthesizing module 204 at the top may acquire the equal-frequency reception signal within the range (intersection range) in which the equal-frequency surface corresponding to the frequency F1 intersects with the reception beam RB1 in each azimuth in the direction parallel with the horizontal plane (θ1-direction in FIG. 10).

An intensity of the acquired equal-frequency reception signal may vary on a time axis according to the intensity of the refection wave from the intersection range. The time axis may correspond to a distance from the reception array 31 within the intersection range. Therefore, by mapping each intensity on the time axis at a position corresponding to the distance from the reception array 31 within the intersection range, the distribution of the intensity data in the intersection range can be obtained. In this manner, by integrating the distribution of the intensity data for the respective azimuths outputted from the beam synthesizing modules 204, the volume data in which the intensity data is distributed three-dimensionally in the detection range can be acquired.

FIG. 12(b) is a functional block diagram of another configuration example of the reception signal processing module 133.

In this configuration example, the bandpass filters 203 may be substituted by an FFT (Fast Fourier Transform) 211 and a frequency extracting module 212. The FFT 211 may calculate frequency spectra based on the one-scanning reception signal of the channels CH1 to CHm. The frequency extracting module 212 may extract frequency components (equal-frequency reception signals) at the frequencies F1 to Fn from the frequency spectrum of each channel calculated by the FFT 211, and supply the extracted frequency components to the corresponding beam synthesizing modules 204. The processing of the beam synthesizing modules 204 is similar to the case illustrated in FIG. 12(a).

Also according to this configuration, similarly to the configuration illustrated in FIG. 12(a), by integrating the distribution of the intensity data for the respective azimuths outputted from the beam synthesizing modules 204, the volume data in which the intensity data is distributed three-dimensionally in the detection range can be acquired. Note that, according to the configuration example illustrated in FIG. 12(b), the frequency at which the equal-frequency reception signal is extracted can be set more finely compared to the configuration example illustrated in FIG. 12(a). Therefore, the number of equal-frequency surfaces to be processed can be increased, and the resolution of the equal-frequency reception signal in the stacking direction of the equal-frequency surfaces can be increased.

Figure 13:
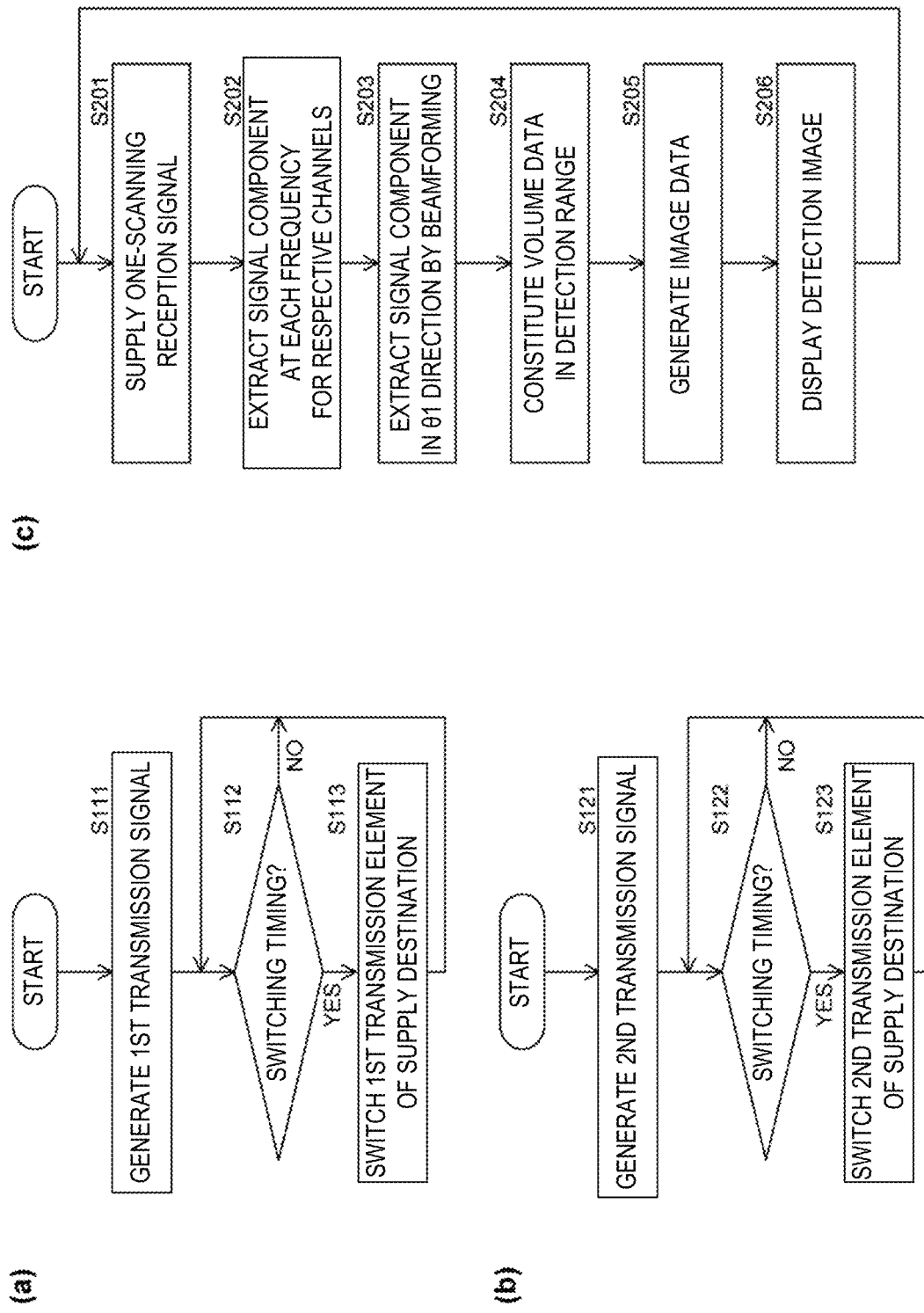
FIG. 13(a) is a flowchart illustrating processing of transmitting the transmission wave from a first transmission array according to this embodiment.
FIG. 13(b) is a flowchart illustrating processing of transmitting the transmission wave from a second transmission array according to this embodiment.
FIG. 13(c) is a flowchart illustrating processing of displaying a detection image by processing a reception signal according to this embodiment.

FIGS. 13(a) and 13(b) are flowcharts each illustrating a wave transmission processing executed by the control part 101 illustrated in FIG. 11. This processing may be executed continuously during detecting operation, and finished in response to the end of the detection operation.

Referring to FIG. 13(a), the control part 101 may cause the first transmission signal generating module 111 to generate the first transmission signal S11 (S111). Then, at a given switching timing (S112: YES), the control part 101 may switch the first transmission element 11a to which the first transmission signal S11 is to be supplied, to the adjacent first transmission element 11a (S113). Here, the switching timing may be a timing when one unit of the first transmission signal S11 with the modulated amplitude (the first transmission signal S11 corresponding to the transmission wave TD11 illustrated in FIG. 6(a)) comes to an end. Then, the control part 101 may return the processing to Step S112, and wait for the arrival of the next switching timing. Accordingly, the first transmission element 11a to which the first transmission signal S11 is to be supplied, can be switched to the adjacent first transmission element 11a at the start timing of one unit of the first transmission signal S11.

Referring to FIG. 13(b), the control part 101 may cause the second transmission signal generating module 121 to generate the second transmission signal S12 at a timing delayed from the generation start timing of the first transmission signal S11 by half the period of one unit of the first transmission signal (S121). As described above, the second transmission signal S12 may have the same frequency and amplitude modulation as the first transmission signal S11. Then, at a given switching timing (S122: YES), the control part 101 may switch the second transmission element 12a to which the second transmission signal S12 is to be supplied, to the adjacent second transmission element 12a (S123). Here, the switching timing may be a timing at a middle position of one unit of the first transmission signal S11 which is being supplied to the first transmission element 11a immediately above the second transmission element 12a which is the current supply destination. Then, the control part 101 may return the processing to Step S122, and wait for the next switching timing. Therefore, the second transmission element 12a to which the second transmission signal S12 is to be supplied, can be switched to the adjacent second transmission element 12a at a timing delayed from the first transmission signal S11 by half the period for one unit of the first transmission signal S11.

According to the processing illustrated in FIGS. 13(a) and 13(b), the first transmission elements 11a and the second transmission elements 12a to which the first transmission signal S11 and the second transmission signal S12 are supplied, may be sequentially switched from above. When the supply destinations are switched to the bottom first transmission element 11a and the bottom second transmission element 12a, and one scanning is finished, the control part 101 may again return the supply destinations to the top first transmission element 11a and the top second transmission element 12a, and execute the next scanning by similar processing. In each scanning, the wave transmission may be performed as described with reference to FIG. 4. In this manner, the transmission beam TB1 in which the equal-frequency surfaces are stacked as described above may be formed.

FIG. 13(c) is a flowchart illustrating processing of displaying the detection image by processing the reception signal. This processing may be continuously executed during the detection operation, and finished in response to the end of the detection operation.

The one-scanning reception signal may be supplied to the plurality of bandpass filters 203 from the buffer 202 (S201). Each bandpass filter 203 may extract frequency components (equal-frequency reception signal) at the frequency set to itself from the inputted reception signal of the respective channels, and supply the extracted frequency components to the corresponding beam synthesizing module 204 (S202). The beam synthesizing module 204 may extract, from the inputted frequency components (equal-frequency reception signal), the signal component of each azimuth in the horizontal direction (θ1-direction) by beamforming (S203). Therefore, the distribution of the intensity data in which the intensity data of the reception signal is mapped on the equal-frequency surface defined by each frequency, can be obtained. The reception signal processing module 133 may integrate the intensity data from all the beam synthesizing modules 204 so as to constitute the volume data where the intensity data is distributed three-dimensionally in the detection range (S204). The reception signal processing module 133 may supply the volume data to the image signal processing module 134.

The image signal processing module 134 may process the volume data to generate the image data for displaying the detected state of the target object in the detection range, and supply the generated image data to the display part 135 (S205). The display part 135 may display the image based on the inputted image data (S206). Therefore, the detected state of the target object in the detection range may be displayed.

Figure 14:
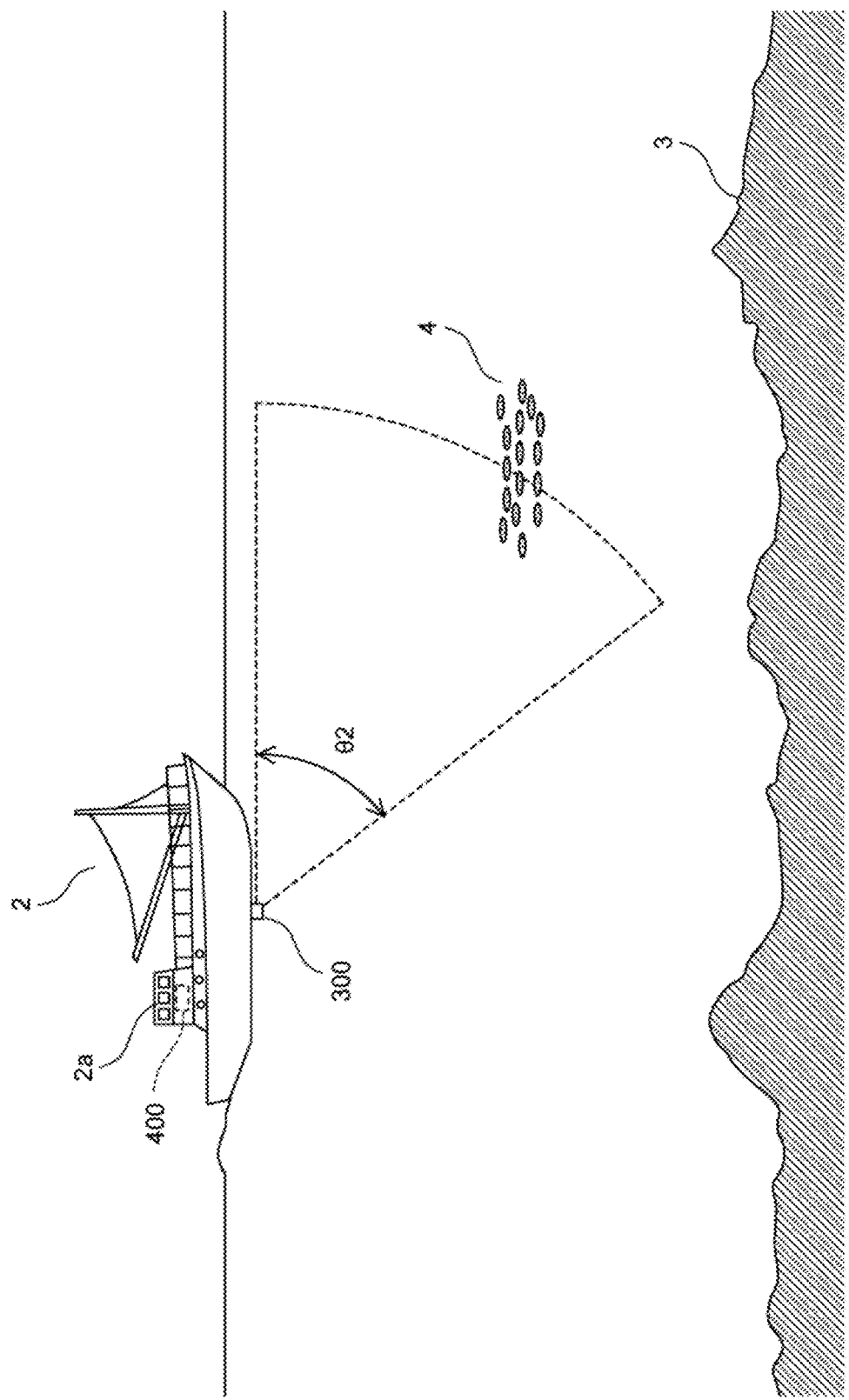
FIG. 14 is a diagram schematically illustrating a configuration when the target object detection device according to this embodiment is used as a sonar which detects an underwater target object.

FIG. 14 is a diagram schematically illustrating a configuration when the target object detection device 1 described above is used as a sonar which detects an underwater target object.

A transducer 300 may be installed in a bottom of a ship 2. The transducer 300 may be provided with the first transmission array 11, the second transmission array 12, and the reception array 31. The first transmission array 11 and the second transmission array 12 may transmit transmission waves underwater through the processing described above. Here, sound waves (e.g., ultrasonic waves) may be transmitted as the transmission waves. Accordingly, the transmission beam TB1 may be formed within a range of an angle θ2 in parallel with a vertical plane such that the equal-frequency surfaces are stacked in the angular direction.

Among the configuration illustrated in FIG. 11, the configuration other than the first transmission array 11, the second transmission array 12, the reception array 31, and the display part 135 may be equipped in a control device installed in a wheelhouse 2a of the ship 2. The display part 135 may be installed in the wheelhouse 2a separately from the control device. The display part 135 may be integrated with the control device.

According to this configuration, a detection image indicative of states of a bottom of water 3 and a school of fish 4 may be displayed on the display part 135, and thus, a user can grasp the underwater state. Note that four transducers 300 oriented forward, rearward, leftward, and rightward, respectively, may be installed in the ship bottom. In this case, the configuration of the transmission system and the reception system illustrated in FIG. 11 may be provided to each transducer 300. As a result, the detection image of the entire circumference of the ship can be displayed on the display part 135.

Further, when the target object detection device 1 is used as a radar which detects a target object in the air, for example, a transducer 400 is installed in a side wall of the wheelhouse 2a. The transducer 400 may be comprised of the first transmission array 11, the second transmission array 12, and the reception array 31. The first transmission array 11 and the second transmission array 12 may transmit transmission waves in the air through the processing described above. Here, radio waves may be transmitted as the transmission waves. A configuration of a circuit part may be installed in the wheelhouse 2a, similarly to the case of the sonar.

According to this configuration, a detection image indicative of states of an obstacle and a flock of birds may be displayed on the display part 135, and thus, a user can grasp the midair state. Note that the transducers 400 may be installed in front, rear, left, and right side walls of the wheelhouse 2a, respectively. In this case, the configuration of the transmission system and the reception system illustrated in FIG. 11 may be provided to each transducer 400. As a result, the detection image of the entire circumferential space of the ship can be displayed on the display part 135.

Effects of Embodiment

According to this embodiment, the following effects can be obtained.

Since the first transmission element 11a to which the first transmission signal S11 is supplied is switched from the first element to the second element in the first transmission array 11, the wave source of the transmission waves may be moved in the lined-up direction of the first transmission elements 11a. Therefore, the frequency of the transmission beam TB1 may change in the moving direction of the wave source due to the Doppler effect, and the plurality of equal-frequency surfaces may be formed in the transmission beam TB1. As a result, by extracting the frequency component corresponding to each equal-frequency surface from the reception signal from the reception element 31a, the reception signal (equal-frequency reception signal) based on the reflection wave from each equal-frequency surface can be obtained. As described above, according to this embodiment, by the switching of the first transmission elements 11a to which first transmission signal S11 is supplied in the first transmission array 11, the equal-frequency reception signals for all of the to-be-observed equal-frequency surfaces can be generated simultaneously. Thus, the target object can be promptly detected with the simple configuration.

Further, in this embodiment, since the first transmission signal S11 is supplied sequentially to the adjacent first transmission element 11a, the wave source of the transmission waves can be finely moved in the lined-up direction of the first transmission elements 11a. Therefore, the frequency change caused by the Doppler effect can be smooth.

Further, in the configuration example illustrated in FIGS. 4 and 10, the second transmission array 12 having the plurality of second transmission elements 12a may be provided, and the second transmission signal S12 may be sequentially supplied to the plurality of second transmission elements 12a. Therefore, by adjusting the first transmission signal S11 and the second transmission signal S12, unnecessary frequency components superimposed in the transmission waves can be suppressed. As a result, the processing based on the reception signal can be performed more accurately.

Further, since the second transmission element 12a is located adjacent to the first transmission element 11a, while the wave source of the transmission wave, which is based on the first transmission signal S11, is moved from the first element to the second element in the first transmission array 11, the second transmission element 12a in the second transmission array 12 may transmit the transmission wave, which is based on the second transmission signal S12, at the position between the first element and the second element in the first transmission array 11. As a result, it becomes easier to maintain the continuity of the transmission waves, and thus, the superimposition of unnecessary frequency components in the transmission waves can be suppressed.

Further, in this configuration, by modulating the amplitude of the first transmission signal S11 and the second transmission signal S12, for example, to be like the waveforms illustrated in FIG. 5(a), the superimposition of unnecessary frequency components in the transmission waves can be suppressed effectively. As a result, a quality of the reception signal for each equal-frequency surface can be enhanced.

Further, as described with reference to FIGS. 12(a) and 12(b), the reception signal processing module 133 may extract, on the basis of the frequency component of the reception signal, the reception signal which is based on the reflection wave from the equal-frequency surface corresponding to the concerned frequency. Therefore, the equal-frequency reception signal for each equal-frequency surface can be acquired smoothly.

Further, as illustrated in FIG. 10, the reception beam RB1 generated based on the reception signal from the reception elements 31a may be configured to intersect with the transmission beam TB1 generated by the first transmission array 11. Therefore, within the range where the reception beam RB1 and the transmission beam TB1 (equal-frequency surface) intersect with each other, the distribution of the intensity data based on the intensity of the reflection waves can be calculated. As a result, by changing the directivity of the reception beam within the detection range by beamforming, the intensity data distributed three-dimensionally in the detection range can be constituted.

<Modifications>

The present disclosure is not limited to the embodiment described above. Moreover, other than the above configuration, the embodiment of the present disclosure can be changed variously.

For example, in the embodiment described above, as illustrated in FIGS. 12(a) and 12(b), the frequency component at each frequency is extracted from the reception signal, and then, the extracted frequency component is separated for the respective azimuths by beamforming. However, the reception signal may first be separated for the respective azimuths by beamforming, and then, the frequency component at each frequency may be extracted from the separated signal of each azimuth. That is, the bandpass filters 203 and the beam synthesizing modules 204 illustrated in FIG. 12(a) may be interchanged with each other, or the FFT 211 and the frequency extracting module 212, and the beam synthesizing modules 204 illustrated in FIG. 12(b) may be interchanged with each other.

Further, although in the embodiment described above the plurality of reception elements 31a are provided as illustrated in FIG. 10, the reflection waves may be received by a single reception element 31a. However, in this case, since the intensity data of the reception signal cannot be divided for the respective azimuths to be mapped on the equal-frequency surfaces, the state of the detection range cannot be displayed as the 3D image like the above embodiment. In such a configuration, the azimuth of the reception beam (the azimuth in the θ1-direction in FIG. 10) may be fixed. The intensity data in each direction in the vertical direction can be acquired by extracting the frequency component of the reception signal from the reception beam in the fixed azimuth. Therefore, by mapping the intensity data in each direction in the vertical direction, a two-dimensional detection image can be displayed.

Further, although in the embodiment described above the first transmission signal S11 and the second transmission signal S12 are the same signal, the first transmission signal S11 and the second transmission signal S12 may be different signals from each other, as long as the unnecessary frequency components in the transmission waves can be reduced. Further, although in the embodiment described above the carrier frequency of the transmission signal S1, the first transmission signal S11, and the second transmission signal S12 is fixed, the frequency of the carrier signal may be modulated like a chirp signal. Alternatively, the first transmission signal S11 may be burst waves, or the second transmission signal S12 may be burst waves.

Further, the switching timing of the first transmission element 11a to which the first transmission signal S11 is to be supplied, and the switching timing of the second transmission element 12a to which the second transmission signal S12 is to be supplied, are not limited to the timings described with reference to FIGS. 13(a) and 13(b). The timings may be other timings, as long as the unnecessary frequency components caused in the transmission waves can be reduced.

Further, the configuration of the first transmission array 11 and the second transmission array 12 is not limited to the configuration of the embodiment described above, but may be another configuration, as long as the frequency may be changed based on the Doppler effect in the transmission beam TB1.

Figure 15:
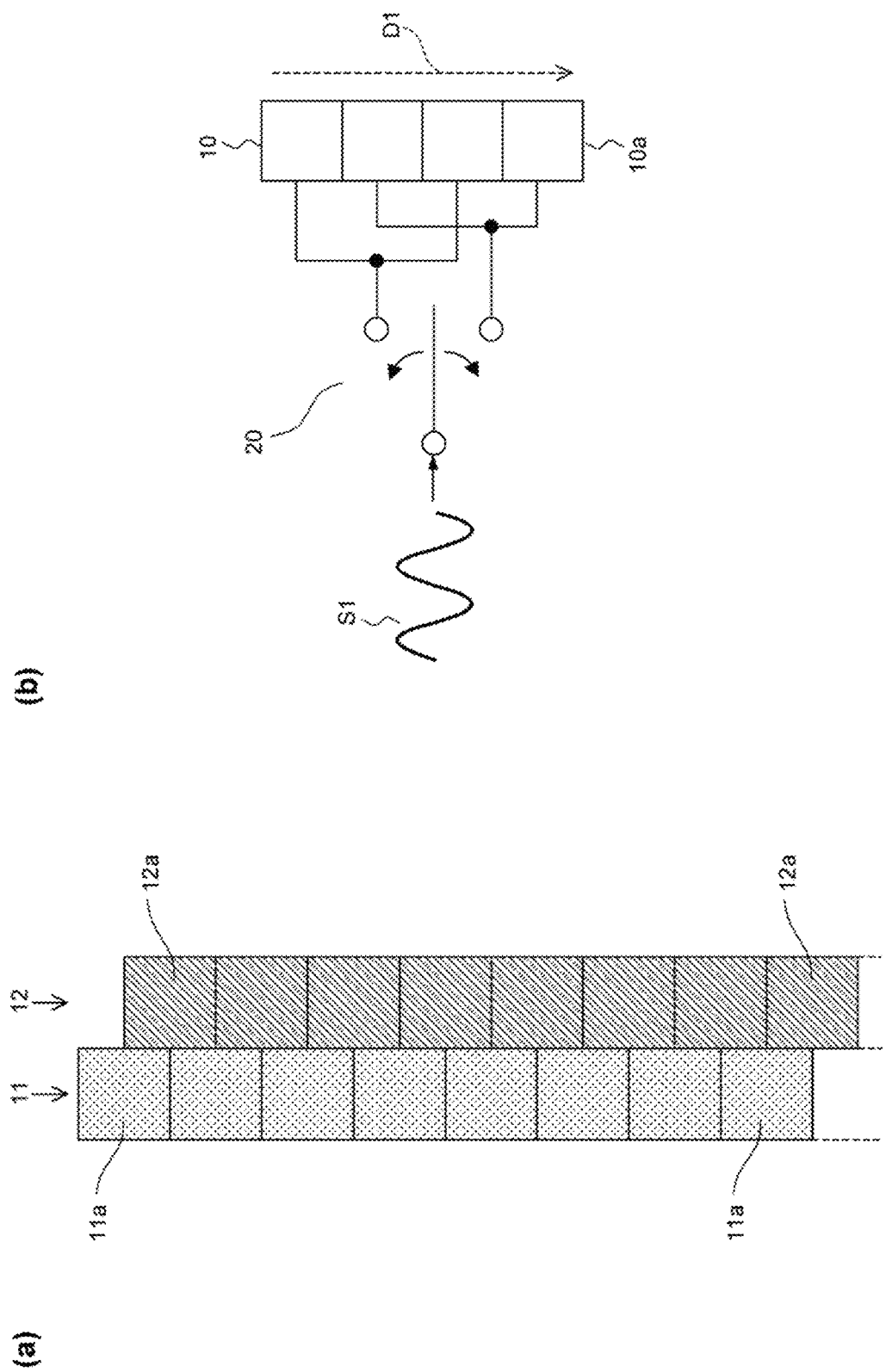
FIG. 15(a) is a diagram illustrating a configuration of the first transmission array and the second transmission array according to a modification.
FIG. 15(b) is a diagram illustrating a configuration of the transmission array and a signal switching part according to another modification.

For example, as illustrated in FIG. 15(a), the first transmission array 11 and the second transmission array 12 may be configured such that the second transmission element 12a is located at a side of a border between the two adjacent first transmission elements 11a. Also in this case, the first transmission signal S11 and the second transmission signal S12 may be supplied to the first transmission elements 11a and the second transmission elements 12a, respectively, at timings similarly to the case illustrated in FIG. 10. Therefore, unnecessary frequency components generated in the transmission waves can be reduced.

Alternatively, as illustrated in FIG. 15(b), the plurality of transmission elements 10a may be divided into a plurality of groups, the plurality of transmission elements in each group are connected to each other so that they are supplied simultaneously, and the supply destination of the transmission signal S1 may be switched between the groups. Also according to this configuration, the wave source can be moved in the moving direction D1, and thus, the frequency may change based on the Doppler effect in the transmission beam TB1. Moreover, since the transmission waves are transmitted per group, an output of the transmission waves can be raised. The number of transmission elements 10a made into one group is not limited to two, but may be three or more.

Further, the number of transmission elements are not limited to the number illustrated in the embodiment described above, but may be another number as long as it is more than one. Moreover, although in the embodiment described above the transmission array and the reception array are disposed to be perpendicular to each other, the transmission array and the reception array may be disposed having an angle therebetween slightly deviated from perpendicular.

Further, although FIG. 11 illustrates the case where the first transmission array 11 and the second transmission array 12 are used, only the first transmission array 11 may be used. In this case, the second transmission array 12, the second transmission signal generating module 121, the second transmission amplifier 122, and the second signal switching part 123 may be omitted from FIG. 11.

Further, although FIG. 14 illustrates the case where the target object detection device 1 (the sonar or the radar) is disposed on the ship 2, the target object detection device 1 (the sonar or the radar) may be installed in a moving body other than the ship 2. Alternatively, the target object detection device 1 (the sonar or the radar) may be installed in a structure (e.g., a buoy) other than the moving body.

Embodiment 2

In the embodiment described above, by actuating the plurality of transmission elements of the transmission array from the top to the bottom only once (scanning), the wave transmission for one pulse corresponding to one unit of detection (1 ping) is performed. In this case, the transmission waves are transmitted from each transmission element only during the actuation of the concerned transmission element. Therefore, a transmission energy of one pulse may be low, and the maximum detectable range may be limited.

In this respect, in Embodiment 2, control for improving the transmission energy of one pulse is performed. In detail, during one unit of detection, the scanning in which the plurality of first transmission elements 11a of the first transmission array 11 and the plurality of second transmission elements 12a of the second transmission array 12 are actuated sequentially in one direction in the method as described with reference to FIG. 4 may be performed a plurality of times so as to generate the pulse. In more detail, in the configuration illustrated in FIG. 4, in a first sequence, the signal switching parts 21 and 22 may be controlled to sequentially supply the transmission signals to the plurality of transmission elements 11a and 12a between a start element and an end element, from the start element to the end element, and in a second sequence subsequent to the first sequence, the signal switching parts 21 and 22 may be controlled to sequentially supply the transmission signals to the plurality of transmission elements 11a and 12a between the start element and the end element, from the start element to the end element. As a result, the transmission energy of one pulse may be increased.

Figure 16:
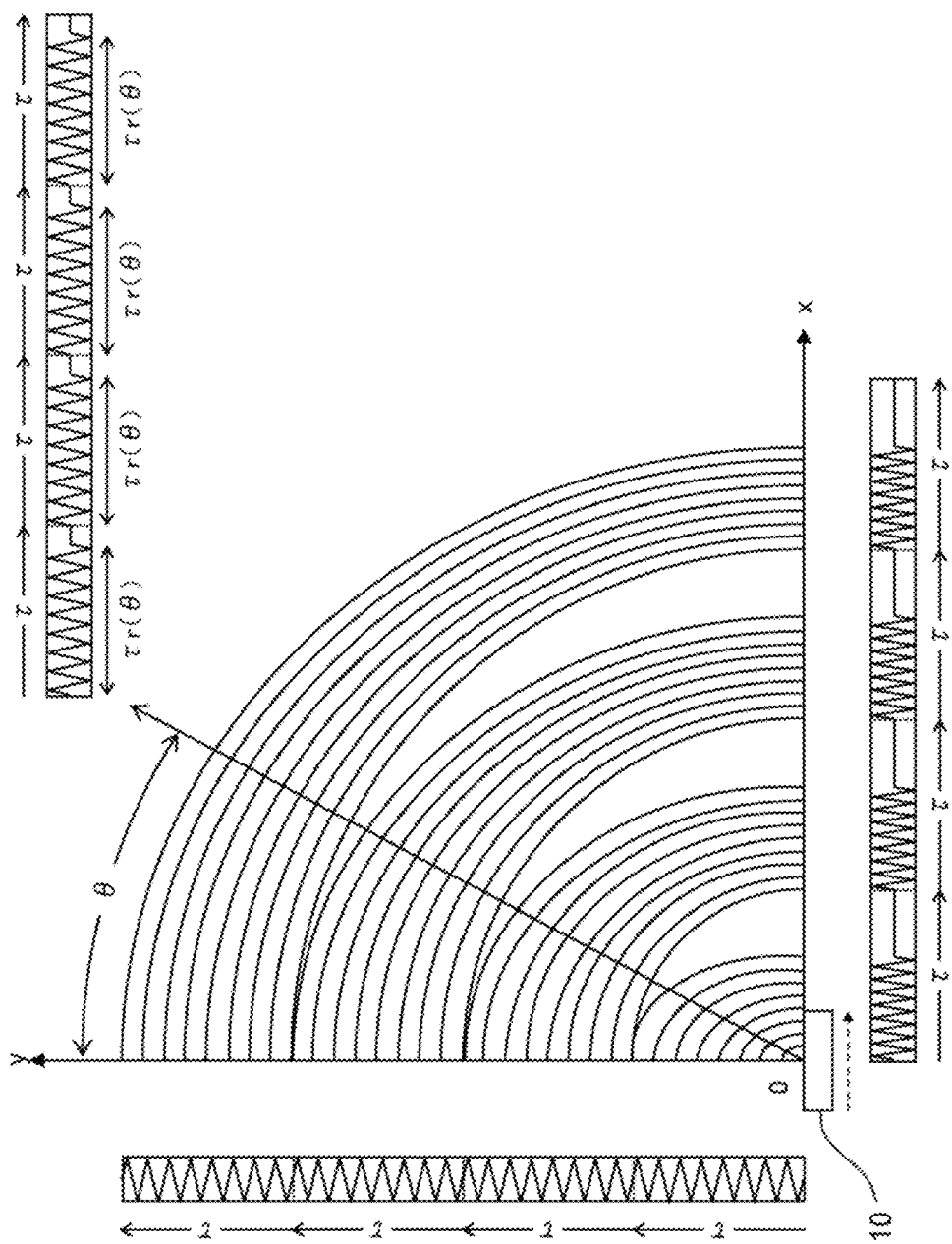
FIG. 16 is a diagram schematically illustrating a state of a sound field when scanning is performed for the transmission array a plurality of times according to Embodiment 2.

FIG. 16 is a diagram schematically illustrating a state of a sound field when the scanning is performed for the first transmission array 11 and the second transmission array 12 in one direction a plurality of times. In FIG. 16, the lined-up direction of the first transmission elements 11a of the first transmission array 11 and the second transmission elements 12a of the second transmission array 12 is set as an x-axis, and the front direction of the first transmission array 11 and the second transmission array 12 is set as a y-axis. Moreover, in FIG. 16, wavefronts of the sound field are illustrated.

After the scanning of the first transmission array 11 and the second transmission array 12 by sequentially actuating the plurality of first transmission elements 11a of the first transmission array 11 and the plurality of second transmission elements 12a of the second transmission array 12 in order from one end (the transmission element at the start position) to the other end (the transmission element at the end position), control to repeat similar scanning may be performed without a time interval. According to this, a state may be created, in which, after a sound source S which transmits at the frequency f0 is moved from the start position to the end position, the sound source S is moved from the start position to the end position without the time interval. By repeating this control a given times during one unit of detection, a period of pulse transmission may be extended, thus the transmission energy may be increased. FIG. 16 illustrates the sound field in a case where the scanning is performed four times during one unit of detection for convenience.

Note that, in the following description, as illustrated in FIG. 1(a), it is assumed that there is no discontinuity in the sound waves in each direction. That is, the influence of the discontinuity of the sound waves illustrated in FIG. 1(b) may be suppressed by the control using the first transmission array 11 and the second transmission array 12 as illustrated in FIG. 4, and the influence of the spurious (unnecessary) peaks illustrated in FIGS. 8(a) and 8(c) is canceled by the frequency filtering by the bandpass filters 203 illustrated in FIG. 12(a) or the frequency extracting module 212 illustrated in FIG. 12(b). The wave transmission by the first transmission array 11 and the second transmission array 12 may also be treated equivalently to the state where the continuity of the sound waves is maintained in all the directions as illustrated in FIG. 1(a) by the frequency filtering being applied to the reception system. Therefore, below, description is made supposing that the discontinuity of the sound waves does not occur in all the directions for convenience.

As illustrated in FIG. 16, a transmission packet in each scanning is time-compressed according to a direction θ in an in-plane direction of a x-y plane with reference to the front direction (hereinafter, referred to as the "direction θ" in Embodiment 2), and the carrier frequency changes. Further, according to this time compression, a gap (a section where a sound pressure is zero) is generated between the transmission packets according to the direction θ. In FIG. 16, the transmission packets in the front direction (y-axis direction), and the transmission packets in the scanning direction of the first transmission array 11 and the second transmission array 12 (x-axis direction) are indicated along the y-axis and the x-axis, respectively, and the transmission packets in an arrowed direction are indicated at a tip end of the arrow. A character "T" given to each transmission packet indicates a period of time spent for the sound source S to move from the start position to the end position, that is, a period of time for one scanning of the first transmission array 11 and the second transmission array 12.

As illustrated in FIG. 16, in the front direction (y-axis direction), since there is no influence of the Doppler effect, the waveform of the transmission packets is maintained to be similar to that of the transmission signal. Therefore, in the front direction, there is no gap between the transmission packets. On the other hand, in the scanning direction (x-axis direction) of the first transmission array 11 and the second transmission array 12, since the waveform of the transmission packets is largely compressed due to the Doppler effect, a large gap occurs between the transmission packets. Further, in the arrowed direction, since the influence of the Doppler effect is smaller than in the x-axis direction, the compression of the waveform of the transmission packets is smaller, and thus, the gap between the transmission packets is reduced.

As described above, since the state of the compression and gap of waveforms is different according to the direction, a frequency spectrum of the sound waves varies according to the direction. That is, in a direction where phase discontinuity is caused by the gap, a spectral intensity decreases, and in a direction where the phase discontinuity is not caused by the gap, the spectral intensity increases. Specifically, in a direction where the gap is an integral multiple of the wavelength, the phase discontinuity does not occur, and therefore the spectral intensity becomes high.

Figure 17:
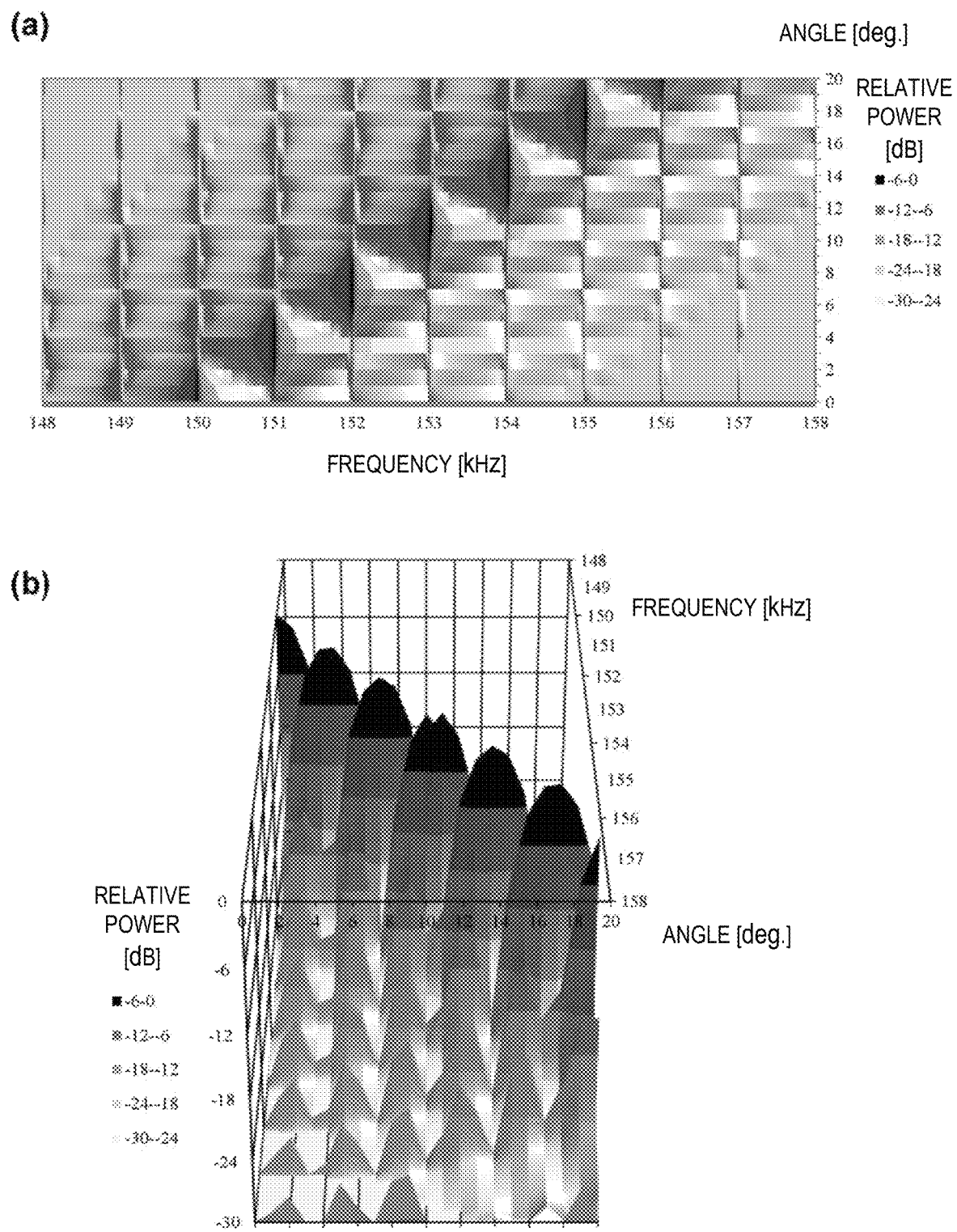
FIG. 17(a) is a diagram illustrating a simulation result by a three-dimensional (3D) contour display, in which a relation between a spectrum of the sound field and a direction is simulated according to Embodiment 2.
FIG. 17(b) is a diagram illustrating the simulation result by a 3D bird's eye view, in which the relation between the spectrum of the sound field and the direction is simulated according to Embodiment 2.

FIGS. 17(a) and 17(b) are diagrams each illustrating a simulation result in which a relation between the spectrum of the sound field and the direction is simulated.

The simulation is performed under the following conditions.

Transmission Frequency: f0=150 kHz
Pulse Width: PW=100 msec
Scanning Period: τ=1 msec That is, continuous waves CW at the fixed transmission frequency f0 are transmitted in each packet. The scanning period τ of each transmission packet is set to 1 msec, and the sound source S is scanned 100 times to form a pulse. That is, the pulse width PW is 100 msec.

FIG. 17(a) illustrates the simulation result in a 3D contour display, and FIG. 17(b) is a 3D bird's eye view from the angle axis.

Referring to FIGS. 17(a) and 17(b), it is apparent that peaks of the spectral intensity (i.e., the transmission beam) are formed at a 1 kHz interval. This mechanism is as follows.

The number of waves transmitted in the front direction (θ=0) during one scanning is "$f_0 \tau$", and this packet of the scanning period τ is repeated so that continuous waves CW having continuous phase and a long pulse width are transmitted in the front direction. On the other hand, in the direction other than the front direction, discontinuity of the phase is caused by the gap according to the direction. However, in a direction where the following relational expression is satisfied, the initial phases are maintained between the packets.

$$f_0 \tau + n = f_n \tau (n=0,1,\ldots) \tag{1}$$

When the gap period (i.e., a phase stop period) is an integral multiple of a carrier cycle in the concerned direction, since the initial phases are the same between the packets, the influence of the gap becomes insignificant. This condition may be represented by the following formula based on Formula (1).

$$f_n = f_0 + \frac{n}{\tau} \tag{2}$$

From Formula (2), it can be understood why the continuous phase (i.e., the direction of sharpening of the spectrum) is formed every 1/τ (i.e., 1 kHz) in FIGS. 17(a) and 17(b).

Next, beam spacing (a gap formed between the transmission beams) is examined.

As described above, the direction where the transmission beam is formed is the direction in which the initial phases are continuous and the carrier frequency satisfies Formula (2). Such a direction $\theta_n$ is associated with other variables by the following formulas.

A gap period in the θ-direction is calculated based on the following formula.

$$\tau - \tau_\theta = \tau - \tau \cdot r(\theta) = \frac{\tau V \sin\theta}{c} \tag{3}$$

Here, "V" is a moving velocity of the sound source S, "c" is a sound velocity, and "r(θ)" is a compression rate of the transmission waves propagated in the θ-direction.

Since a direction where the gap period becomes an integral multiple of the cycle of the carrier frequency in the θ-direction is $\theta_n$, $\theta_n$ may be defined by the following formula.

$$\frac{\tau V \sin\theta_n}{c} = n \cdot \frac{1}{f(\theta_n)} = n \cdot \frac{1}{f_0} \cdot \frac{c - V \sin\theta_n}{c} \tag{4}$$

Therefore, $\theta_n$ may be calculated based on the following formula.

$$\theta_n = \sin^{-1}\left(\frac{n \cdot c}{f_0 \cdot V} \cdot \frac{1}{\tau + \frac{n}{f_0}}\right) \tag{5}$$

Accordingly, the transmission beam is formed in the direction $\theta_n$ calculated based on Formula (5). Therefore, by extracting the carrier frequency in the direction $\theta_n$ by the bandpass filters 203 illustrated in FIG. 12(a) or the frequency extracting module 212 illustrated in FIG. 12(b), the reception signal for each transmission beam can be extracted.

Embodiment 3

Referring to FIG. 17(b), the gap between the transmission beams is large to continuously image the detection range in the θ-direction. That is, the reception signal may be missing within an angular range between the transmission beams, thus generation of the favorable detection image may be difficult. In this respect, in Embodiment 3, control for forming other transmission beams between the transmission beams illustrated in FIG. 17(b) is performed.

In a direction at the middle between the adjacent transmission beams, the phase is inversed every transmission packet. Therefore, by transmitting the transmission signal which is inversed in its polarity per transmission packet, the initial phases in the concerned direction should be phased.

Figure 18:
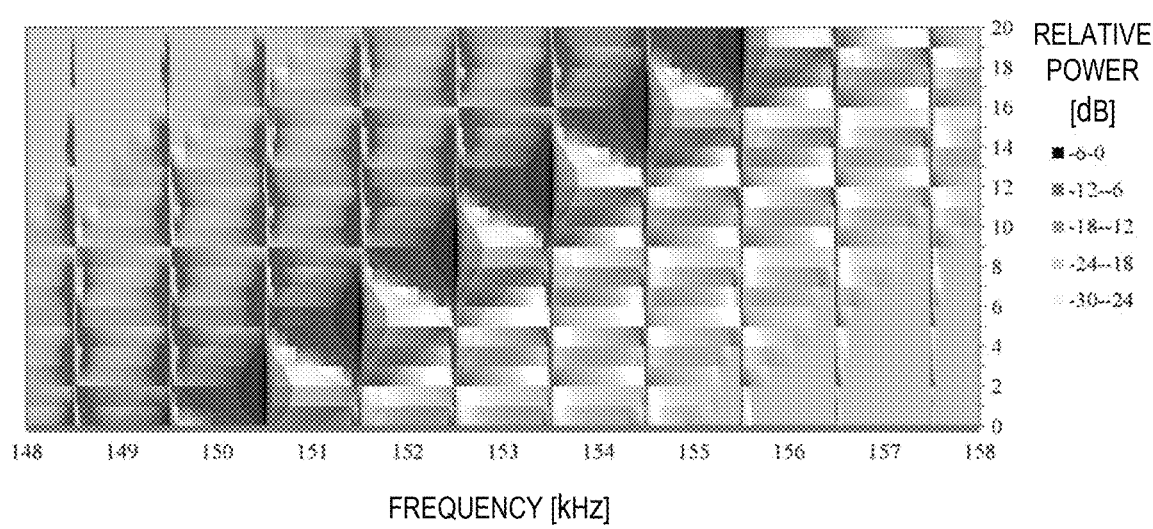
FIG. 18(a) is a diagram illustrating a simulation result by a 3D contour display, in which the relation between the spectrum of the sound field and the direction is simulated according to Embodiment 3.
FIG. 18(b) is a diagram illustrating the simulation result by a 3D bird's eye view, in which the relation between the spectrum of the sound field and the direction is simulated according to Embodiment 3.
Figure 18:
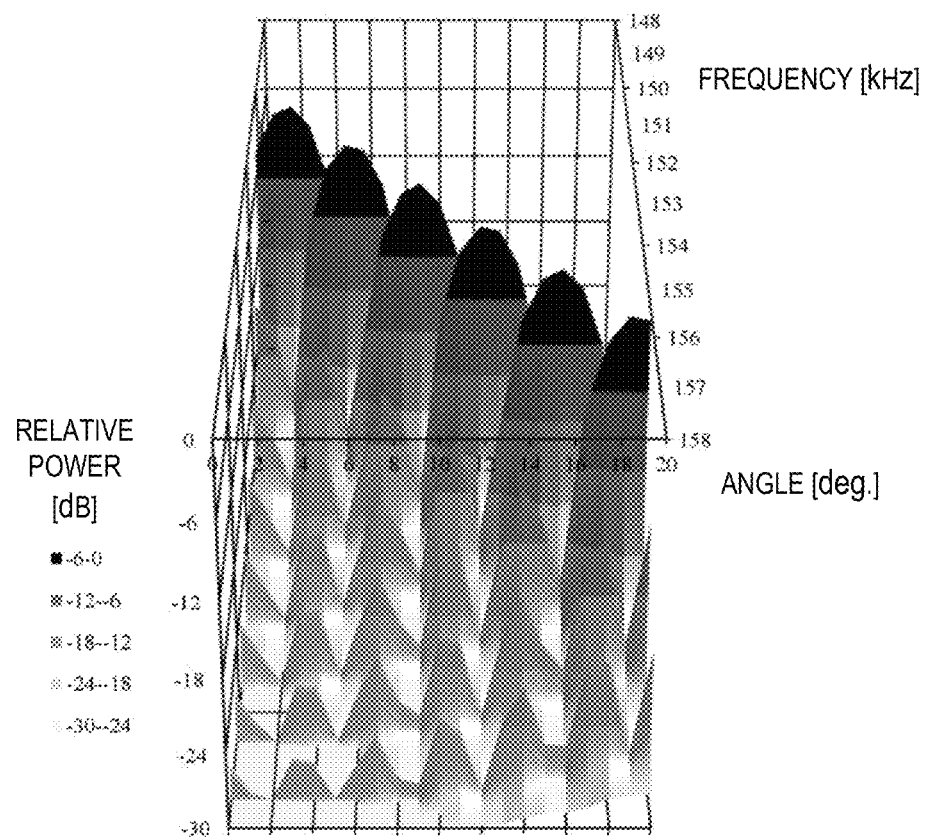

FIGS. 18(a) and 18(b) are diagrams each illustrating a simulation result in which a relation between the spectrum of the sound field and the direction when transmitting the transmission signal which is inversed in its polarity per transmission packet is simulated. Conditions for the simulation are similar to the conditions for the simulation illustrated in FIGS. 17(a) and 17(b), except for inverting the polarity of the transmission signal every transmission packet.

Referring to FIGS. 18(a) and 18(b), in the direction at the middle between the transmission beams illustrated in FIGS. 17(a) and 17(b), the transmission beam is formed. That is, in FIGS. 18(a) and 18(b), the transmission beam which interpolates the direction between the transmission beams illustrated in FIGS. 17(a) and 17(b) is formed. Therefore, for example, during one unit of detection, by performing a first transmission process in which the transmission packet is repeatedly transmitted without inversing the polarity every transmission packet, and performing a second transmission process in which the transmission packet is repeatedly transmitted while inversing the polarity every transmission packet, the processes can mutually interpolate the direction where the transmission beam is omitted. Thus, the detection range can be imaged continuously in the θ-direction. Also in this case, by applying the carrier frequency of each transmission beam to the bandpass filters 203 illustrated in FIG. 12(a) or the frequency extracting module 212 illustrated in FIG. 12(b), the reception signal for each transmission beam can be extracted.

Note that, in the first transmission process and the second transmission process, the polarity of the transmission signal may be inversed in one of an odd number or an even number. Therefore, the transmission processes can mutually interpolate the direction where the transmission beam is omitted.

Embodiment 4

In Embodiment 3 described above, when the first transmission process and the second transmission process are performed in two transmission/reception steps, the frame rate is halved. On the other hand, when the first transmission process and the second transmission process are performed simultaneously, the transmission packets with the inversed polarity between the transmission processes interfere with each other, thus, deleting the transmission waves. Therefore, performing the first transmission process and the second transmission process simultaneously may be equivalent to suspending the transmission in the odd-numbered or the even-numbered transmission packets. In this respect, in Embodiment 4, the suspension of the transmission in the odd-numbered or the even-numbered transmission packets is examined.

Based on Formula (2), it is apparent that by repeating the transmission at a cycle twice the scanning period τ (i.e., 2τ), the gap between the transmission beams can be reduced by half. In this case, for example, by transmitting only the even-numbered transmission packets or the odd-numbered transmission packets among the series of transmission packets illustrated in FIG. 16, the scanning cycle becomes twice. Therefore, when only the even-numbered or odd-numbered transmission packets are transmitted in this manner, the gap between the transmission beams should be halved.

Figure 19:
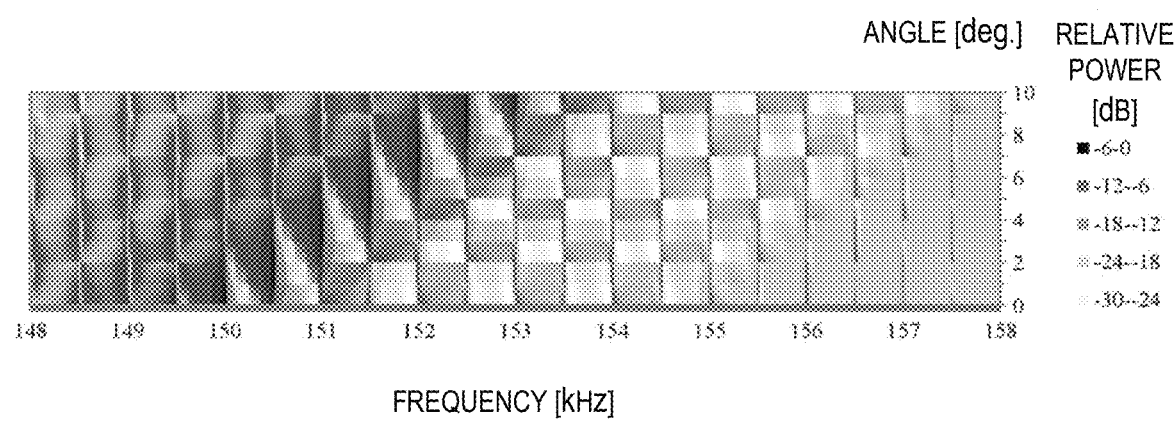
FIG. 19(a) is a diagram illustrating a simulation result by a 3D contour display, in which the relation between the spectrum of the sound field and the direction is simulated according to Embodiment 4.
FIG. 19(b) is a diagram illustrating the simulation result by a 3D bird's eye view, in which the relation between the spectrum of the sound field and the direction is simulated according to Embodiment 4.
Figure 19:
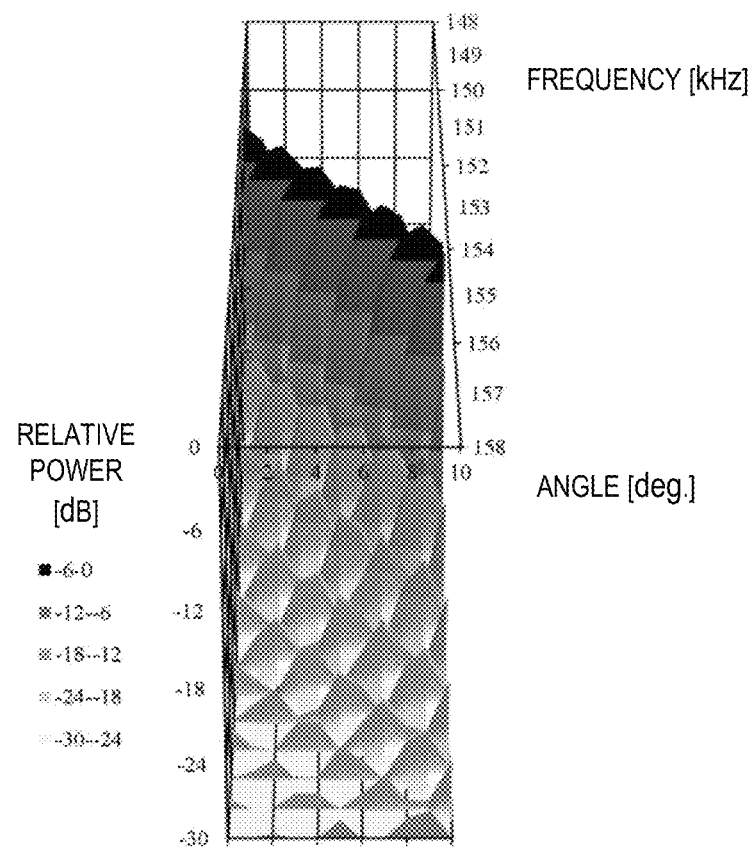

FIGS. 19(a) and 19(b) are diagrams each illustrating a simulation result in which a relation between the spectrum of the sound field and the direction when only the even-numbered transmission packets are transmitted is simulated. Conditions for the simulation are similar to the conditions for the simulation illustrated in FIGS. 17(a) and 17(b), except for transmitting only the even-numbered transmission packets.

Referring to FIGS. 19(a) and 19(b), compared to the case illustrated in FIGS. 17(a) and 17(b), the gap between the transmission beams is halved. Therefore, when the first transmission array 11 and the second transmission array 12 are controlled to transmit only the even-numbered or odd-numbered transmission packets, the gap between the transmission beams can be narrowed. That is, by transmitting only the even-numbered or odd-numbered transmission packets, the gap between the transmission beams can be narrowed while reducing the pulse width of the pulse transmitted in one unit of detection and improving the range resolution. As a result, the detection range can be imaged continuously in the θ-direction.

Further, according to Embodiment 4, since information for one unit of detection can be obtained by one transmission/reception, the frame rate during the generation of the detection image can be increased. Note that, when the frame rate can be made low, the first transmission process and the second transmission process may be divided into two transmission/reception steps as described in Embodiment 3.

Further, the information for one unit of detection may be obtained by one transmission/reception in which the first transmission process and the second transmission process are carried out sequentially without an interval.

Embodiment 5

When the transmission packets are transmitted repeatedly more than once in one unit of detection like Embodiment 2, the transmission energy is increased, and thus, a signal-to-noise (S/N) ratio rises. On the other hand, since the transmission period (pulse width) in one unit of detection becomes longer, the range resolution decreases. In this respect, in Embodiment 5, the improvement in the range resolution using pulse compression is examined.

The present inventors examined the sound field by simulation under a condition in which the sound source S, which transmits a linear-frequency-modulated (LFM) chirp signal with the pulse width at 100 msec and a chirp sweeping width at 1 kHz, is uniformly moved at a velocity V repeatedly from the start position to the end position. In this examination, parameters of the linear chirp signal (LFM) are set as follows.

<LFM Parameters>
  Sweep Start Frequency: fs=150 kHz
  Sweep Frequency: fsweep=1 kHz
  Sweep Period (LFM pulse width)=100 msec
  Window Function: Hanning (applied to the pulse of 100 msec)
  Sound Source Sweep Length: L=16λo (λo: wave length at sweep start
    frequency)
  Sound Source Sweep Period (scanning period): τ=1 msec That is, the linear chirp signal of which the frequency linearly shifts from 150 kHz to 151 kHz in 100 msec is sectioned every 1 msec to actuate the transmission array, and transmit one pulse.

Figure 20:
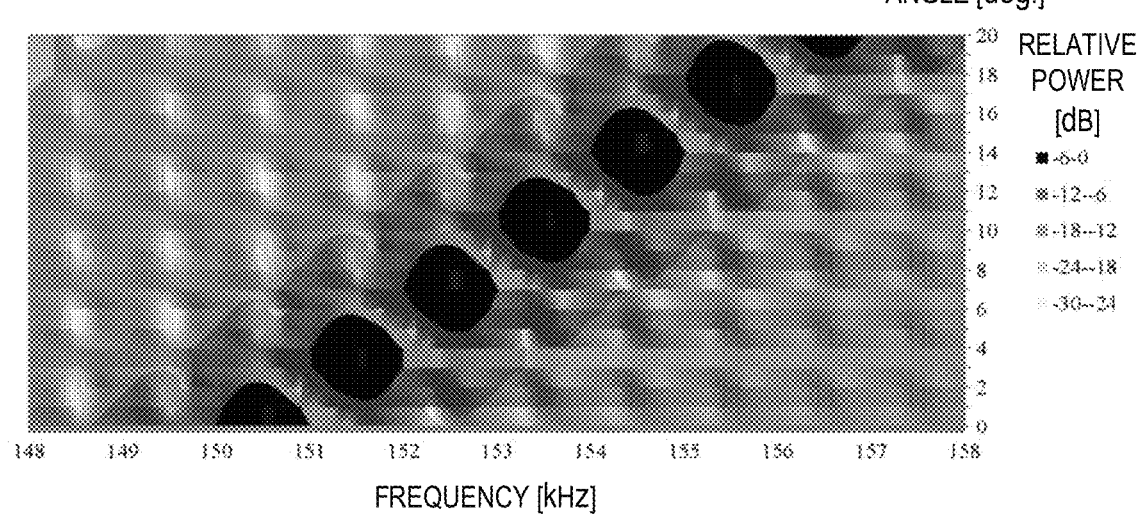
FIG. 20(a) is a diagram illustrating a simulation result by a 3D contour display, in which the relation between the spectrum of the sound field and the direction is simulated according to Embodiment 5.
FIG. 20(b) is a diagram illustrating the simulation result by a 3D bird's eye view, in which the relation between the spectrum of the sound field and the direction is simulated according to Embodiment 5.
Figure 20:
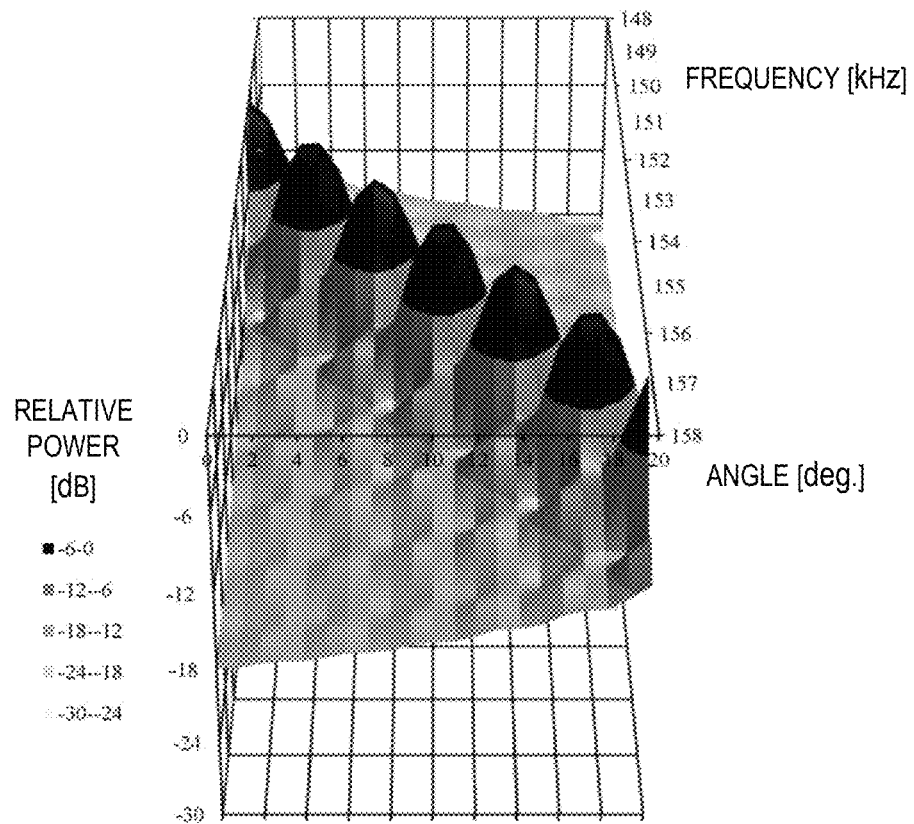

FIGS. 20(a) and 20(b) are diagrams each illustrating the simulation result in which the relation between the spectrum of the sound field and the direction is simulated when the transmission is performed by the linear chirp signal of the above conditions.

As illustrated in FIGS. 20(a) and 20(b), also in the case where the transmission is performed by the linear chirp signal of the above conditions, the transmission beams can be formed at a pitch similar to the case illustrated in FIGS. 17(a) and 17(b).

Next, in order to examine a time response after the pulse compression, an autocorrelation function of the direction in which the transmission beam is formed in FIGS. 20(a) and 20(b) is calculated.

Figure 21:
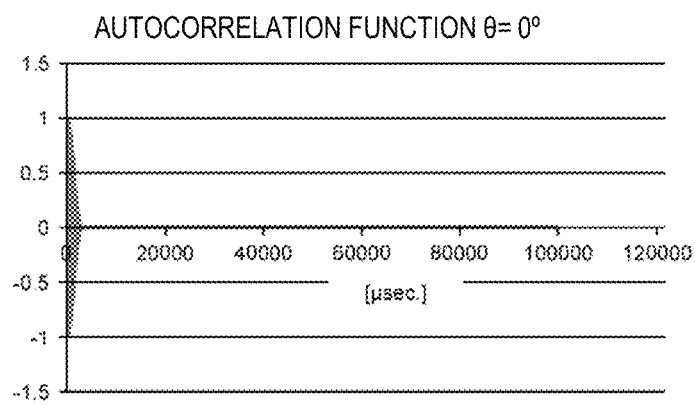
FIG. 21(a) is a graph illustrating an autocorrelation function at the angle 0° according to Embodiment 5.
FIG. 21(b) is an enlarged graph of a range between 1-4,000 μsec in the graph illustrated in FIG. 21(a)
FIG. 21(c) is a graph illustrating the autocorrelation function at the angle 7° according to Embodiment 5.
FIG. 21(d) is an enlarged graph of a range between 1-4,000 μsec in the graph illustrated in FIG. 21(c).
Figure 21:
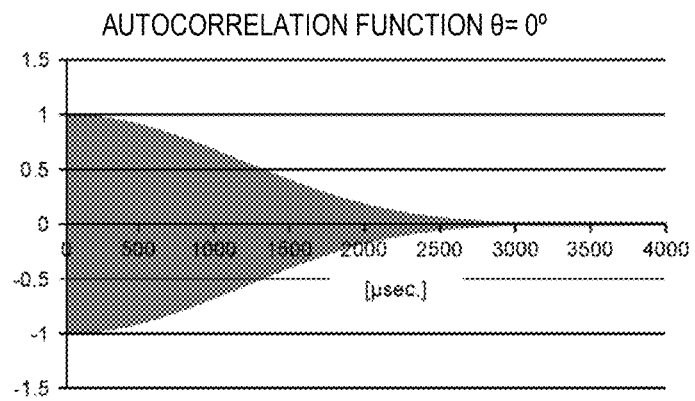
Figure 21:
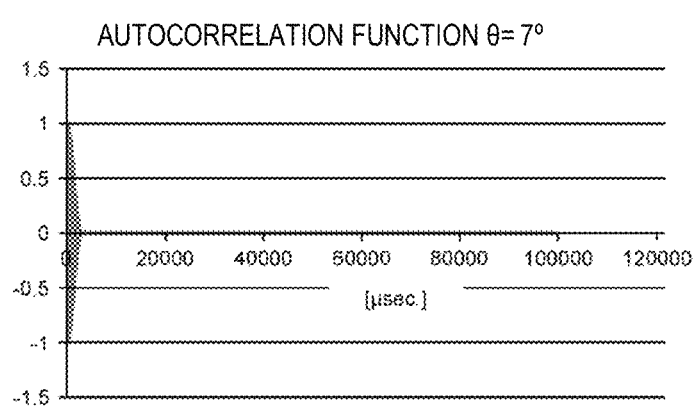
Figure 21:
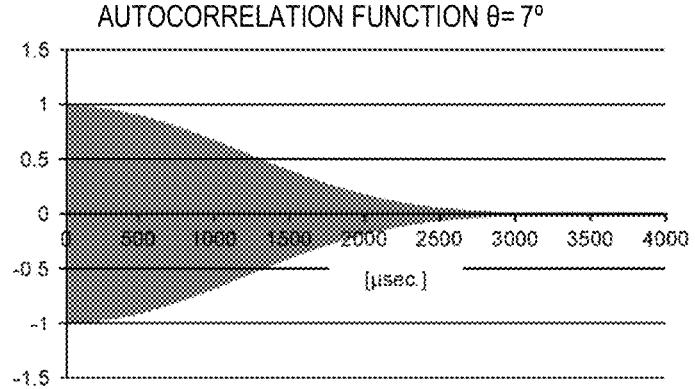

FIGS. 21(a) and 21(b) are graphs each illustrating the autocorrelation function at the angle 0°, and FIGS. 21(c) and 21(d) are graphs each illustrating the autocorrelation function at the angle 7°. FIGS. 21(b) and 21(d) are enlarged graphs of a range between 1-4,000 μsec in the graphs illustrated in FIGS. 21(a) and 21(c), respectively.

From the result illustrated in FIGS. 21(a) to 21(d), by using the transmission waveform in the transmission beam direction as a compression filter coefficient, it is possible to achieve good pulse compression with few time-axis side lobes. In FIGS. 21(a) to 21(d), the pulse width of 100 msec is compressed to about 3 msec. Therefore, by further providing the reception signal processing module 133 illustrated in FIG. 11 for processing the reception signal with a compression filter having a coefficient corresponding to the waveform of the transmission beam in each direction, the range resolution can be increased in the direction of each transmission beam.

Further, also in this embodiment, similarly to Embodiment 2, the gaps between the transmission beams is large. Therefore, in order to interpolate the transmission beams at the gaps, similarly to Embodiment 3, application of the method of inversing the polarity every transmission packet is examined.

Figure 22:
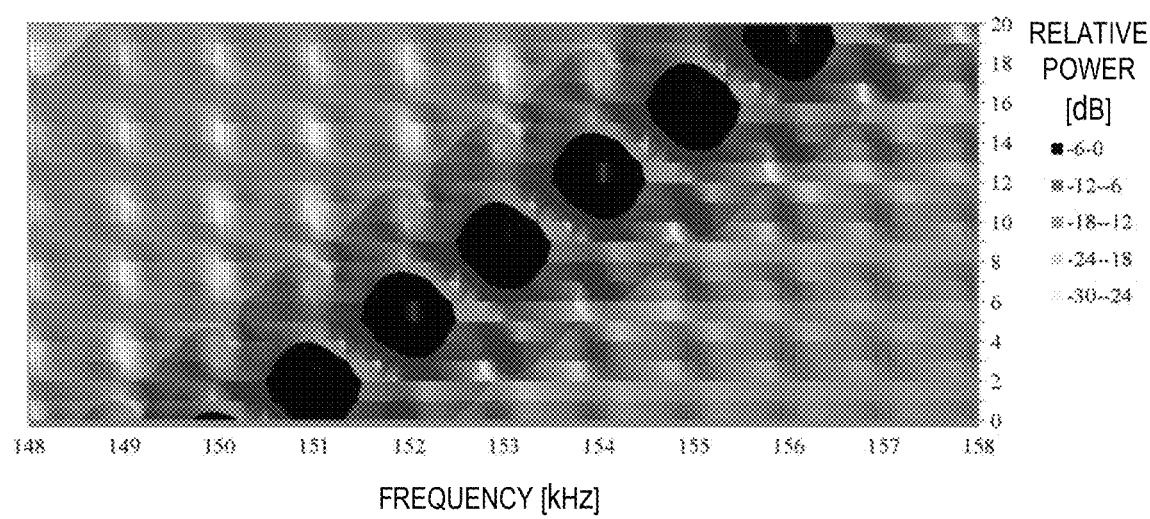
FIG. 22(a) is a diagram illustrating a simulation result by a 3D contour display, in which the relation between the spectrum of the sound field and the direction is simulated according to Embodiment 5.
FIG. 22(b) is a diagram illustrating the simulation result by a 3D bird's eye view, in which the relation between the spectrum of the sound field and the direction is simulated according to Embodiment 5.
Figure 22:
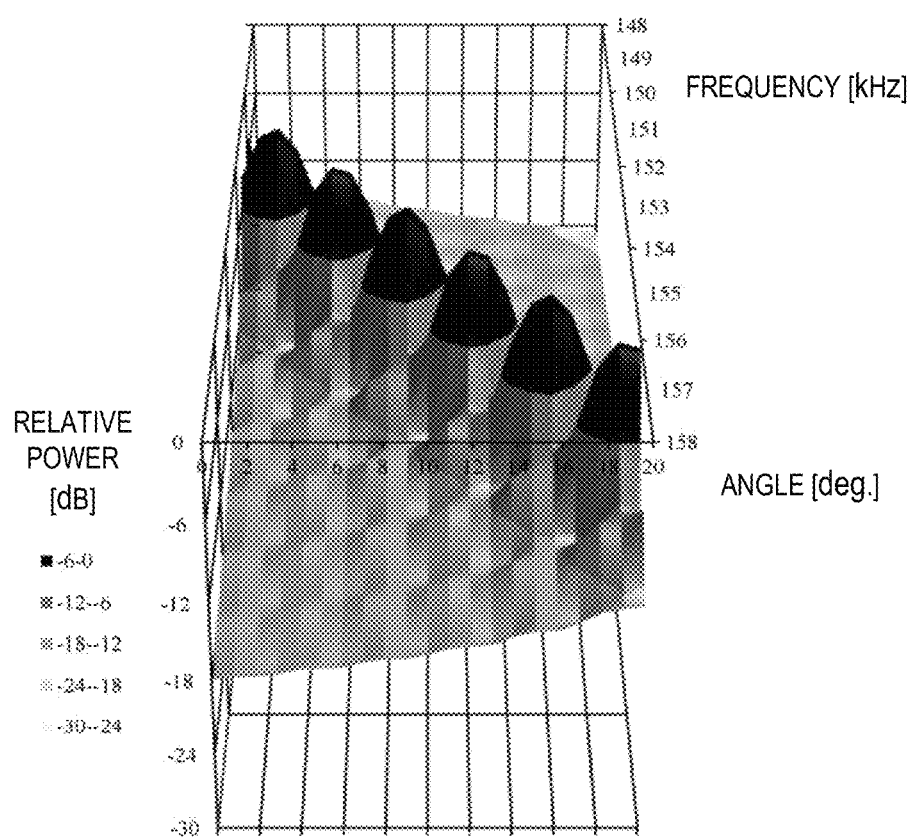

FIGS. 22 (a) and 22(b) are diagrams each illustrating a simulation result in which the relation between the spectrum of the sound field and the direction is simulated in the case where the linear chirp signal of the above conditions is transmitted.

In this simulation, under the simulation conditions illustrated in FIGS. 20(a) and 20(b), the polarity of the linear chirp signal is inversed every scanning period τ. Other simulation conditions are similar to those in FIGS. 20(a) and 20(b).

Referring to FIGS. 22(a) and 22(b), it can be seen that transmission beams for interpolating directions between the adjacent transmission beams illustrated in FIGS. 20(a) and 20(b) are formed. Therefore, by combining a first transmission process where the linear chirp signal with the polarity inversed every scanning period τ is used for the wave transmission, and a second transmission process where the linear chirp signal with the polarity not inversed every scanning period τ is used for the wave transmission, the transmission processes can mutually interpolate the direction between the transmission beams. As a result, the detection range can be imaged continuously in the θ-direction.

Figure 23:
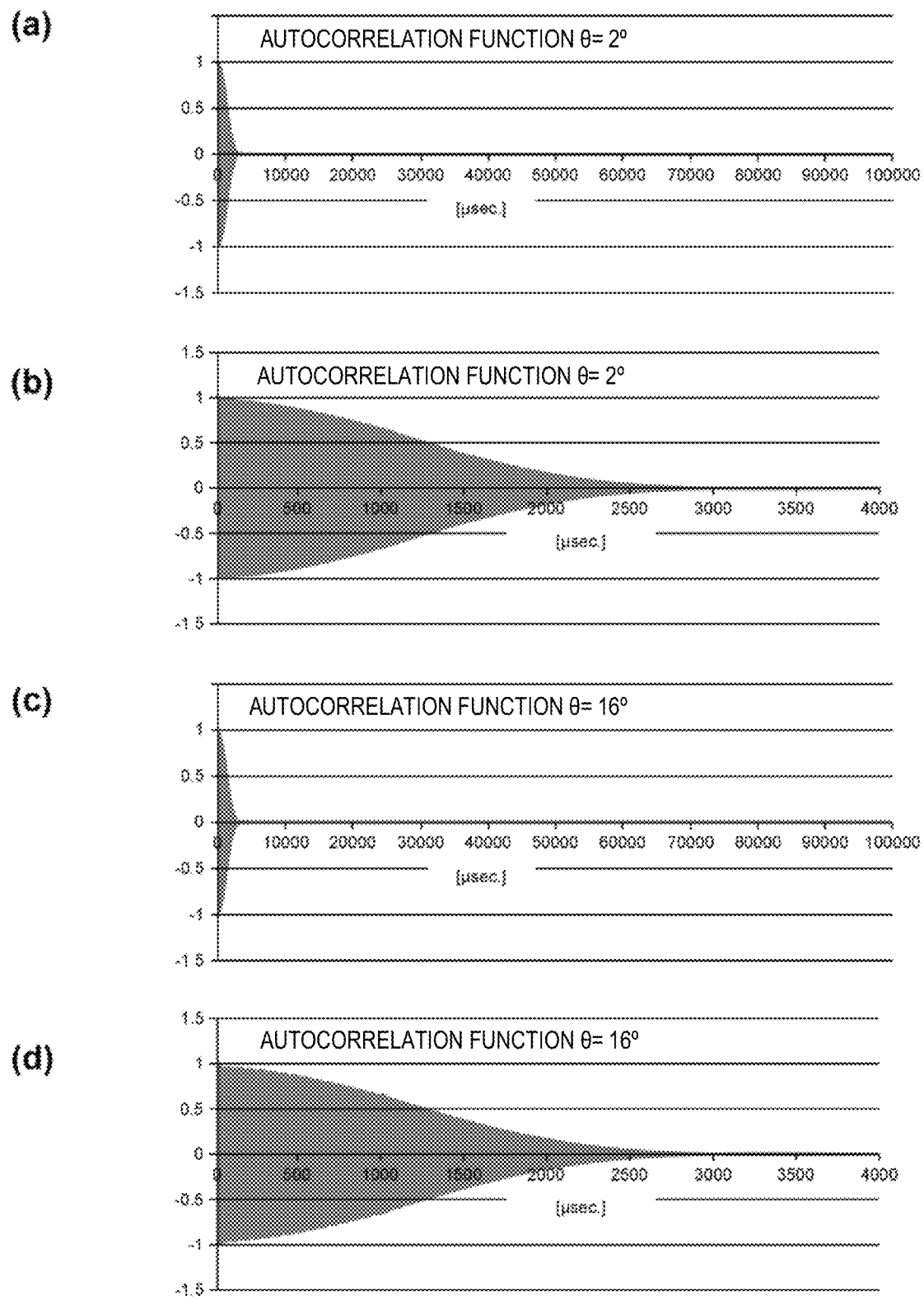
FIG. 23(a) is a graph illustrating the autocorrelation function at the angle 2° according to Embodiment 5.
FIG. 23(b) is an enlarged graph of a range between 1-4,000 μsec in the graph illustrated in FIG. 23(a)
FIG. 23(c) is a graph illustrating the autocorrelation function at the angle 16° according to Embodiment 5.
FIG. 23(d) is an enlarged graph of a range between 1-4,000 μsec in the graph illustrated in FIG. 23(c).

FIGS. 23(a) and 23(b) are graphs each illustrating the autocorrelation function at the angle 2° where the transmission beam illustrated in FIGS. 22(a) and 22(b) is formed, and FIGS. 23(c) and 23(d) are graphs each illustrating the autocorrelation function at the angle 16° where the transmission beam illustrated in FIGS. 22(a) and 22(b) is formed. FIGS. 23(b) and 23(d) are enlarged graphs of a range between 1-4,000 μsec in the graphs illustrated in FIGS. 23(a) and 23(c), respectively.

Also from the result illustrated in FIGS. 23(a) to 23(d), similarly to FIGS. 21(a) to 21(d), by using the transmission waveform in the transmission beam direction as the compression filter coefficient, it is possible to achieve good pulse compression with few time-axis side lobes. Also in FIGS. 23(a) to 23(d), the pulse width of 100 msec is compressed to about 3 msec. Therefore, also in this case, similarly to the case described above, the range resolution can be increased in the direction of each transmission beam by using the compression filter.

Note that in Embodiment 5, as in Embodiment 4, instead of the control for sequentially performing the first transmission process and the second transmission process, the control for transmitting only the odd-numbered or even-numbered transmission packets (scanning period) may be performed.

Note that, when a chirp signal is transmitted as the transmission signal, as described above, parts of the signal to be supplied to a first element and a second element may differ from each other, and therefore, a first part of the transmission signal may be supplied to the first element, and a second part of the transmission signal different from the first part may be supplied to the second element. Without any limitation to a chirp signal, for example for a single frequency transmission signal or any other transmission signal, a first part of the transmission signal may be supplied to the first element, and a second part of the transmission signal different from the first part may be supplied to the second element.

Embodiment 6

Although in Embodiments 2 to 4 all of the transmission packets are scanned in only one direction, the scanning direction of the transmission packets is not limited to this. In Embodiment 6, the moving direction of the sound source S (i.e., the scanning direction) may be reversed between the odd-numbered transmission packet and the even-numbered transmission packet.

In this case, after the sound source S performs scanning in one direction, it may perform the scanning in the other direction without a time interval. That is, the sound source S may be reciprocated a plurality of times. In detail, the first transmission array 11 and the second transmission array 12 may be sequentially actuated in the order from the transmission element at one end to the transmission element at the other end, and then, sequentially actuated in the order from the transmission element at the other end to the transmission element at the one end without a time interval.

Figure 24:
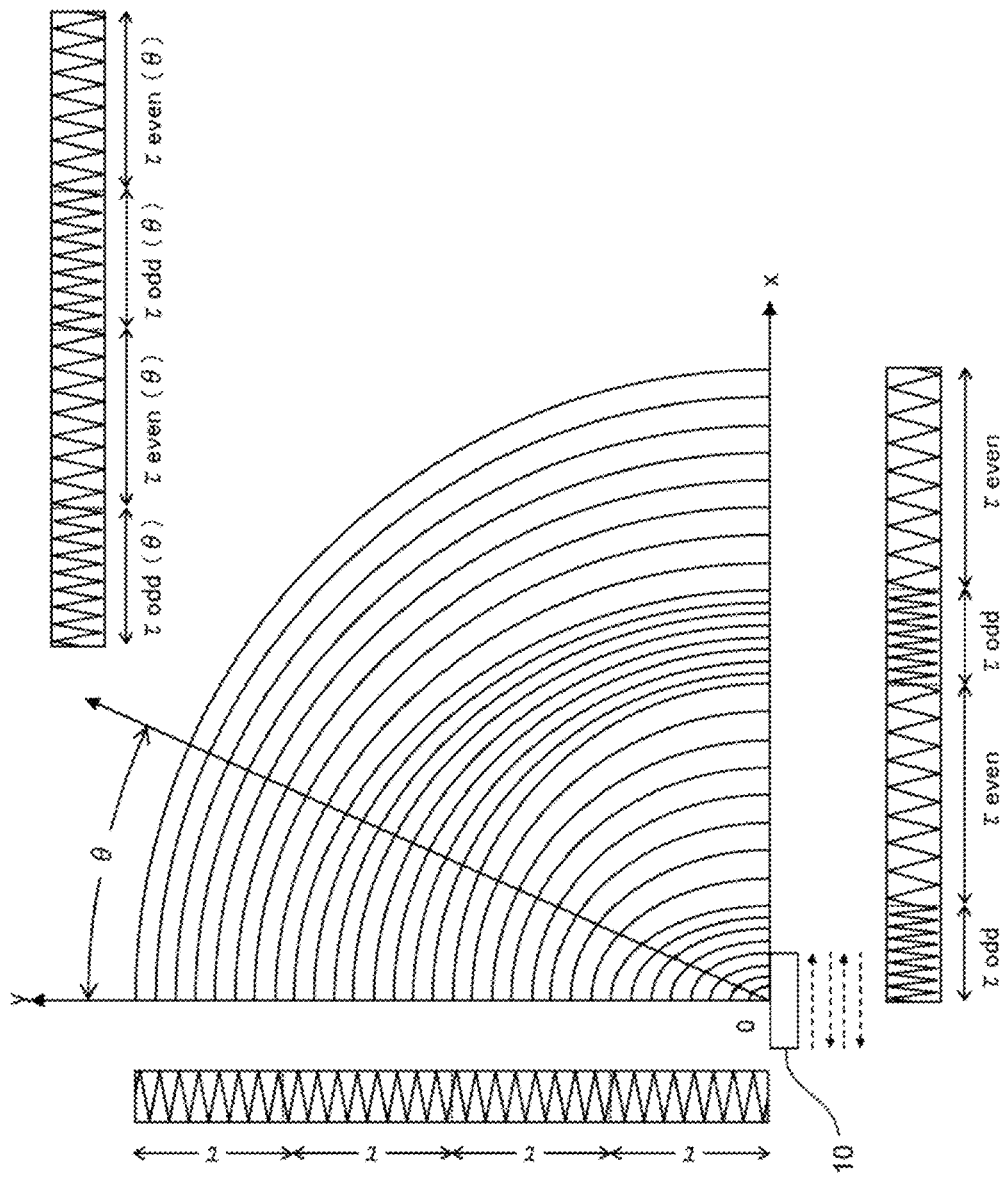
FIG. 24 is a diagram schematically illustrating a state of the sound field when reciprocating scanning is performed for the transmission array a plurality of times according to Embodiment 6.

FIG. 24 is a diagram schematically illustrating a state of the sound field when the first transmission array 11 and the second transmission array 12 are reciprocally scanned a plurality of times.

The transmission packet of each scanning is time-compressed according to the direction θ, thus the carrier frequency is changed. Moreover, since the scanning direction is opposite between the odd-numbered transmission packet and the even-numbered transmission packet, the compression rates are different between the odd-numbered and even-numbered transmission packets. Assuming that the velocity of each scanning is $V_{odd}$ and $V_{even}$, compression rates $r_{odd}(\theta)$ and $r_{even}(\theta)$ of the odd-numbered and even-numbered transmission packets are represented by the following formulas, respectively.

$$r_{odd}(\theta) = \frac{c - V_{odd}\sin(\theta)}{c} \quad (6)$$

$$r_{even}(\theta) = \frac{c + V_{even}\sin(\theta)}{c} \quad (7)$$

As can be seen from FIG. 24 and Formulas (6) and (7), compression and expansion are alternately performed in the direction θ.

Further, the transmission frequencies may be different between the odd-numbered transmission packet and the even-numbered transmission packet. In this case, the transmission frequency of the odd-numbered transmission packet and the transmission frequency of the even-numbered transmission packet may be set to frequencies that do not affect the transmission of the other transmission packet.

Figure 25:
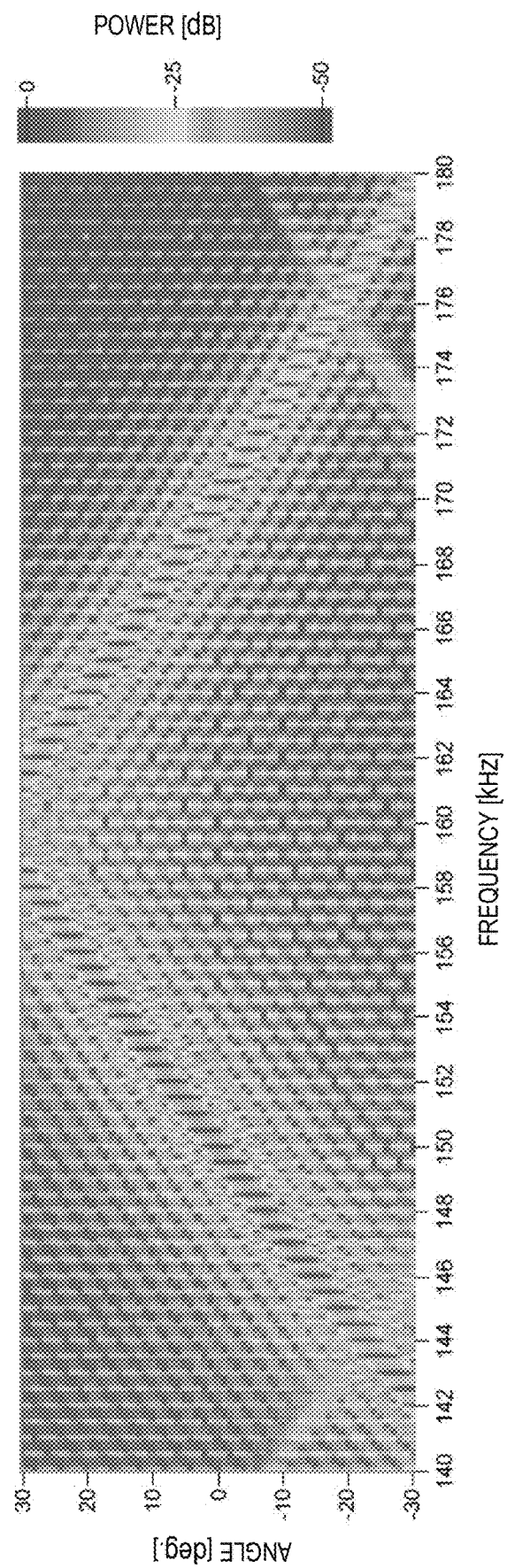
FIG. 25 is a diagram illustrating a simulation result in which a relation between a spectrum of the sound field and the direction is simulated according to Embodiment 6.

FIG. 25 is a diagram illustrating a simulation result in which a relation between a spectrum of the sound field and the direction is simulated in a case where the reciprocating scanning is performed ten times while changing the transmission frequencies between the odd-numbered transmission packets and the even-numbered transmission packets.

Conditions for the simulation is as follows.
Sound Source Sweep Length: L=16λo (λo: wave length at 150 kHz)
Scanning Period (per scanning): τ=1 msec
Odd-numbered Transmission Packet: f0=150 kHz, $V_{odd}$=160 msec
Even-numbered Transmission Packet: f0=170 kHz, $V_{even}$ 160 msec Under the above conditions, the sound source S is reciprocated ten times. That is, the odd-numbered transmission packets are formed by the motion of the sound source S in the forward path, and the even-numbered transmission packets are formed by the motion of the sound source S in the return path. The moving velocity of the sound source S in the forward and return paths is set to be the same.

As illustrated in FIG. 25, two frequency components are included in one direction. Also in Embodiment 6, similarly to Embodiments 2 to 5 described above, by separating the frequencies by the bandpass filters (or the compression filters) or the FFT, the reception signal in each direction can be acquired.

Note that, in this transmission method, since the period of the odd-numbered transmission packet and the period of the even-numbered transmission packet are separated by the frequencies, similarly to Embodiment 4, the transmission cycle of the odd-numbered transmission packets becomes longer, which narrows the gap between the transmission beams. Similarly, the transmission cycle of the even-numbered transmission packets becomes longer, which narrows the gap between the transmission beams. As a result, the gap between the transmission beams can be narrowed, and the detection range can be imaged continuously in the θ-direction.

In Embodiment 6, since transmission is performed even in the transmission packets whose transmissions are suspended in Embodiment 4, the transmission energy of the pulse in one unit of detection is remarkably improved.

Note that although in the simulation illustrated in FIG. 25 the sound source S is reciprocated, the moving direction of the sound source S (i.e., the scanning directions of the transmission packets) may be the same between the odd-numbered transmission packets and the even-numbered transmission packets. Also in this case, the transmission frequency of the odd-numbered transmission packets and the transmission frequency of the even-numbered transmission packets may be set to a frequency that does not affect the transmission of the other transmission packet. Accordingly, a frequency spectrum in which two frequency components are included in one direction can be formed, and the transmission energy of the pulse in one unit of detection can be remarkably enhanced.

Further, also in Embodiment 6, similarly to Embodiment 5, the pulse compression may be performed by using a chirp signal as the transmission signal.

Terminology

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processor. A processor can be a microprocessor, but in the alternative, the processor can be a controller, microcontroller, or state machine, combinations of the same, or the like. A processor can include electrical circuitry configured to process computer-executable instructions. In another embodiment, a processor includes an application specific integrated circuit (ASIC), a field programmable gate array (FPGA) or other programmable device that performs logic operations without processing computer-executable instructions. A processor can also be implemented as a combination of computing devices, e.g., a combination of a digital signal processor (DSP) and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. The same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations).

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.).

For expository purposes, the term "horizontal" as used herein is defined as a plane parallel to the plane or surface of the floor of the area in which the system being described is used or the method being described is performed, regardless of its orientation. The term "floor" can be interchanged with the term "ground" or "water surface." The term "vertical" refers to a direction perpendicular to the horizontal as just defined. Terms such as "above," "below," "bottom," "top," "side," "higher," "lower," "upper," "over," and "under," are defined with respect to the horizontal plane.

As used herein, the terms "attached," "connected," "mated," and other such relational terms should be construed, unless otherwise noted, to include removable, moveable, fixed, adjustable, and/or releasable connections or attachments. The connections/attachments can include direct connections and/or connections having intermediate structure between the two components discussed.

Numbers preceded by a term such as "approximately," "about," and "substantially" as used herein include the recited numbers, and also represent an amount close to the stated amount that still performs a desired function or achieves a desired result. For example, the terms "approximately," "about," and "substantially" may refer to an amount that is within less than 10% of the stated amount. Features of embodiments disclosed herein preceded by a term such as "approximately," "about," and "substantially" as used herein represent the feature with some variability that still performs a desired function or achieves a desired result for that feature.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A target object detection device, comprising:
   a first transmission signal generator configured to generate a first transmission signal;
   a first transmission array comprising a plurality of transmission elements configured to convert the first transmission signal into a first transmission wave;
   a first switch configured to supply the first transmission signal to a first transmission element in the first transmission array;
   a controller configured to control the first switch to switch the first transmission signal from the first transmission element in the first transmission array to a second transmission element in the first transmission array at a first timing;
   a second transmission signal generator configured to generate a second transmission signal;
   a second transmission array comprising a plurality of transmission elements configured to convert the second transmission signal into a second transmission wave; and
   a second switch configured to supply the second transmission signal to a first transmission element in the second transmission array while the first transmission signal is being supplied to the first transmission element in the first transmission array,
   wherein the controller is further configured to control the second switch to switch the second transmission signal from the first transmission element in the second transmission array to a second transmission element in the second transmission array at a second timing after the first timing and before the first switch switches the first transmission signal from the second transmission element in the first transmission array to a third transmission element in the first transmission array.

2. The target object detection device of claim 1, wherein the second transmission element in the first transmission array is adjacent to the first transmission element in the first transmission array.

3. The target object detection device of claim 1, wherein the controller controls the first switch to switch the first transmission signal from the second transmission element in the first transmission array to the third transmission element in the first transmission array at a third timing after the first and second timing and before the second switch switches the second transmission signal from the second transmission element in the second transmission array to a third transmission element in the second transmission array.

4. The target object detection device of claim 1, wherein a carrier of the first transmission signal has a single frequency, or the carrier of the first transmission signal is a modulated signal.

5. The target object detection device of claim 1,
wherein the plurality of transmission elements of the first transmission array are grouped into a plurality of groups, the plurality of the transmission elements of the first transmission array in each group being connected,
wherein the first switch is configured to supply the first transmission signal to one of the groups in the first transmission array, and
wherein the controller is configured to control the first switch to switch the group to which the first transmission signal is supplied from a first group to a second group at the first timing.

6. The target object detection device of claim 1, wherein the controller is further configured to supply the second transmission signal to the first transmission element in the second transmission array while the first switch switches the first transmission signal from the first transmission element in the first transmission array to the second transmission element in the first transmission array.

7. The target object detection device of claim 1,
wherein the second transmission element is adjacent to the first transmission element in the second transmission array, and
wherein the first transmission element of the first transmission array is adjacent to the first transmission element of the second transmission array.

8. The target object detection device of claim 1, wherein a carrier of the second transmission signal has a single frequency, or the carrier of the second transmission signal is a modulated signal.

9. The target object detection device of claim 1,
wherein the first transmission signal generator modulates an amplitude of the first transmission signal, and
wherein the second transmission signal generator modulates an amplitude of the second transmission signal.

10. The target object detection device of claim 1, wherein a carrier frequency of the second transmission signal is same as a carrier frequency of the first transmission signal.

11. The target object detection device of claim 1, further comprising:
a reception array comprising at least one reception element configured to receive a reflection wave, the reflection wave being a single wave resulting from a reflection of both of the first and second transmission wave on a target object, and convert the reflection wave into a reception signal; and
processing circuitry configured to process the reception signal,
wherein the processing circuitry extracts, based on a frequency component of the reception signal, an equal-frequency reception signal based on the reflection wave from an equal-frequency surface corresponding to the frequency component.

12. The target object detection device of claim 11, wherein, by extracting a plurality of frequency components from the reception signal at different frequencies, the processing circuitry acquires equal-frequency reception signals of equal-frequency surfaces corresponding to the different frequencies.

13. The target object detection device of claim 11, wherein the processing circuitry calculates a frequency spectrum of the reception signal, and, based on the frequency spectrum, acquires the equal-frequency reception signal of the equal-frequency surface corresponding to each frequency.

14. The target object detection device of claim 11,
wherein the reception array comprises a plurality of reception elements, and
wherein the processing circuitry performs beamforming based on the reception signal from each reception element, and calculates an incoming direction of the reflection wave from the target object based on the beamforming.

15. The target object detection device of claim 11,
wherein the reception array comprises a plurality of reception elements,
wherein the reception array is different from the first transmission array, and
wherein a reception beam generated based on the reception signal from each reception element intersects with a transmission beam generated by the first transmission array.

16. The target object detection device of claim 1, wherein the target object detection device is a sonar configured to detect an underwater target object, or a radar configured to detect a midair target object.

17. The target object detection device of claim 1,
wherein, in a first sequence, the first switch is controlled to supply the first transmission signal to the plurality of transmission elements in the first transmission array between a start transmission element and an end transmission element in the first transmission array by sequentially supplying the first transmission signal to transmission elements in the first transmission array that get closer to the end transmission element in the first transmission array as the first sequence progresses with time, and
wherein, in a second sequence subsequent to the first sequence, the first switch is controlled to supply the first transmission signal to the plurality of transmission elements in the first transmission array between the start transmission element and the end transmission element in the first transmission array by sequentially supplying the first transmission signal to transmission elements in the first transmission array that get closer to the end transmission element in the first transmission array as the second sequence progresses with time.

18. The target object detection device of claim 1,
wherein, in a first sequence, the first switch is controlled to supply the first transmission signal to the plurality of transmission elements in the first transmission array between a start transmission element and an end transmission element in the first transmission array by sequentially supplying the first transmission signal to transmission elements in the first transmission array that get closer to the end transmission element in the first transmission array as the first sequence progresses with time, wherein, after the first sequence, the controller switches a position of the start transmission element and the end transmission element in the first transmission array so that the start transmission element and the end transmission element used in the first sequence are a switched end transmission element and a switched start transmission element, respectively, and wherein, in a second sequence subsequent to switching the position of the start transmission element and the end transmission element, the first switch is controlled to supply the first transmission signal to the plurality of transmission elements in the first transmission array between the switched start transmission element and the switched end transmission element in the first transmission array by sequentially supplying the first transmission signal to transmission elements in the first transmission array that get closer to the switched end transmission element in the first transmission array as the second sequence progresses with time.

19. The target object detection device of claim 1, wherein a first part of the first transmission signal is supplied to the first transmission element in the first transmission array, and a second part of the first transmission signal different from the first part is supplied to the second transmission element in the first transmission array.

20. A target object detection method performed by a target object detection device, the target object detection method comprising:
   generating a first transmission signal;
   converting the first transmission signal into a first transmission wave;
   supplying the first transmission signal to a first transmission element in a first transmission array of the target object detection device;
   switching the first transmission signal from the first transmission element in the first transmission array to a second transmission element in the first transmission array at a first timing;
   generating a second transmission signal;
   converting the second transmission signal into a second transmission wave;
   supplying the second transmission signal to a first transmission element in a second transmission array of the target object detection device while the first transmission signal is being supplied to the first transmission element in the first transmission array; and
   switching the second transmission signal from the first transmission element in the second transmission array to a second transmission element in the second transmission array at a second timing after the first timing and before switching the first transmission signal from the second transmission element in the first transmission array to a third transmission element in the first transmission array.

* * * * *